United States Patent
Chopra et al.

(10) Patent No.: US 10,810,536 B2
(45) Date of Patent: Oct. 20, 2020

(54) SYSTEM AND METHOD FOR DYNAMIC PAIRING FUNCTION OPTIMIZATION

(71) Applicant: DoorDash, Inc., San Francisco, CA (US)

(72) Inventors: Rohan Balraj Chopra, San Francisco, CA (US); Richard Hwang, San Francisco, CA (US); Jeff Ning Han, Palo Alto, CA (US)

(73) Assignee: DOORDASH, INC., San Francisco, CA (US)

( * ) Notice: Subject to any disclaimer, the term of this patent is extended or adjusted under 35 U.S.C. 154(b) by 295 days.

(21) Appl. No.: 15/826,736

(22) Filed: Nov. 30, 2017

(65) Prior Publication Data

US 2019/0164126 A1    May 30, 2019

(51) Int. Cl.
| | |
|---|---|
| *G06Q 10/08* | (2012.01) |
| *G06Q 50/28* | (2012.01) |
| *G06N 3/02* | (2006.01) |
| *G06Q 50/12* | (2012.01) |

(52) U.S. Cl.
CPC ... *G06Q 10/08355* (2013.01); *G06Q 10/0834* (2013.01); *G06Q 50/12* (2013.01); *G06Q 50/28* (2013.01); *G06N 3/02* (2013.01)

(58) Field of Classification Search
CPC .............................................. G06Q 10/08355
USPC ....................................................... 705/334
See application file for complete search history.

(56) References Cited

U.S. PATENT DOCUMENTS

| | | |
|---|---|---|
| 9,269,103 B1 | 2/2016 | Kumar et al. |
| 9,639,908 B1* | 5/2017 | Reiss ..................... G06Q 50/12 |
| 2014/0279294 A1 | 9/2014 | Field-Darragh et al. |
| 2015/0019354 A1* | 1/2015 | Chan ..................... A47J 37/00 |
| | | 705/15 |
| 2015/0227888 A1 | 8/2015 | Levanon et al. |
| 2016/0140507 A1 | 5/2016 | Stevens et al. |
| 2017/0024789 A1* | 1/2017 | Frehn ................. G06Q 30/0621 |

OTHER PUBLICATIONS

A Fuzzy System for package Shipment Selection for Electronic Systems. Published by IEEE (Year: 2003).*

(Continued)

*Primary Examiner* — Jeff Zimmerman
*Assistant Examiner* — Zeina Elchanti
(74) *Attorney, Agent, or Firm* — Kwan & Olynick LLP

(57) ABSTRACT

Provided are systems and processes for optimizing assignments of deliveries for perishable goods. In one aspect, a method is provided for pairing a set of created orders with a set of available couriers. The set of created orders may include orders confirmed by the merchant and the set of available couriers include couriers that are online with an active status. Feasible pairings are generated between each courier and each created order. Infeasible pairings are eliminated based on factors such as transportation mode. Possible routes for each pairing are generated and scored based on weighted factors. The scores are optimized to achieve a set of routes with a maximum score. The routes are then offered to the corresponding courier if the courier will arrive at or after the created order is completed by the merchant. A neural network may be implemented to recognize the optimal score for a given duration.

20 Claims, 12 Drawing Sheets

(56) References Cited

OTHER PUBLICATIONS

"Technological Disruption and Innovation in Last-Mile Delivery," gsb.stanford.edu/r/vcii, Jun. 2016, 26 pages.
Claudia Archetti, "The Vehicle Routing Problem with Occasional Drivers," Sep. 16, 2015, 18 pages.
Remy Spliet, "Vehicle Routing with Uncertain Demand," Erasmus Research Institute of Management—ERIM, Oct. 2013, 132 pages.
"Int'l Application Serial No. PCT/US18/62010, Int'l Search Report and Written Opinion dated Mar. 11, 2019", 11 pgs.

\* cited by examiner

|  | Delivery 810 | Delivery 812 | Delivery 814 |
|---|---|---|---|
| Courier 820 | X | 2 | 1 |
| Courier 822 | 3 | 2 | 4 |
| Courier 824 | 2 | 5 | 1 |
| Courier 826 | 2 | 1 | 1 |

*FIG. 8*

SYSTEM AND METHOD FOR DYNAMIC PAIRING FUNCTION OPTIMIZATION

TECHNICAL FIELD

The present disclosure relates to a system for facilitating real-time, on-demand delivery of perishable goods. In one example, the present disclosure relates to mechanisms and processes for optimizing assignment of deliveries to couriers.

BACKGROUND

Logistics platform, particularly logistics platforms for managing real-time on-demand deliveries of perishable goods, rely on accurate location, status, and routing mechanisms to effectively and efficiently connect consumers with the providers of the perishable goods. In some systems, tens of thousands of orders may be placed in real-time for delivery. To enable fast and on-time delivery, especially for perishable goods, such orders must be offered to the courier who is capable of completing the delivery most efficiently.

Consequently, it is desirable to provide improved mechanisms for optimizing delivery routes and the handling of orders, particularly with respect to logistics platforms for managing real-time on-demand deliveries of perishable goods.

SUMMARY

Provided are various mechanisms and processes relating to optimizing the pairing of delivery offers for perishable goods with couriers. In one aspect, which may include at least a portion of the subject matter of any of the preceding and/or following examples and aspects, a method for dynamic pairing function optimization is provided. The method comprises receiving, at a server, a first filtered dataset corresponding to a plurality of orders created for real-time deliveries of perishable goods from a plurality of merchants. The first filtered data set is filtered by a time threshold and a confirmation milestone.

The method further comprises receiving, at the server, a second filtered dataset corresponding to a plurality of available couriers. The second filtered dataset is filtered by an active status threshold.

The method further comprises generating a set of preferred data pairings from the first and second filtered datasets. Generating the set of preferred data pairings comprises shard sorting the union of the first dataset and the second dataset into a plurality of sorted groups. The shard sorting is based at least partially on geographic data associated data values in the first and second datasets. For each sorted group, possible data pairings are identified between the first data value from the first dataset and a second data value from the second dataset. Then the possible data pairings are filtered to eliminate infeasible pairings to form a set of feasible pairings. The infeasible pairings are determined using factors including transportation mode. The infeasible pairings may be determined based on additional constraints, including one or more of the following: vehicle type, vehicle size, order size, and type of food.

Then possible routes associated with each feasible pairing are generated. Each feasible pairing is scored based on weighted factors. Then the set of feasible pairings that maximizes the sum of scores across all pairings is solved for using a mathematical solver.

The method further comprises selecting the corresponding feasible pairing if a projected time value for a route is greater than or equal to an expected perishable good ready time value. If the projected time value for a route is not greater than or equal to the expected time value, the order and the courier corresponding to the feasible pairing are marked for reconsideration in generating a set of preferred data pairings. The projected time value for a route may correspond to the estimated time that the courier corresponding to the route will arrive at the merchant and wherein the expected time value corresponds to the completion of preparation of an order by the merchant.

The time threshold may correspond to a predicted time interval to the completion of preparation, and the confirmation milestone may correspond to confirmation of receipt of a corresponding order by a corresponding merchant. The active status threshold may correspond to a courier being online and actively accepting delivery assignments.

The geographic data associated data values include one or more of the following: geographic proximity between a real-time location of a courier and a location of a pick-up location corresponding to an order, regional boundaries, supply and demand conditions, and historical courier data.

Generating a set of preferred data pairings further includes inputting the first and second filtered dataset into a trained neural network to automatically predict projected time values and expected time values based on trained factors including: vehicle type, vehicle size, order size, and type of food.

The second filtered dataset may be determined by expanding or contracting an active region defined by geo-hashed data coordinates to maintain a desired ratio of orders created to available couriers within the active re.

Other implementations of this disclosure include corresponding devices, systems, and computer programs, as well as and associated methods for dynamic pairing function optimization. These other implementations may each optionally include one or more of the following features. For instance, a non-transitory computer readable medium is provided comprising one or more programs configured for execution by a computer system. In some embodiments, the one or more programs comprise instructions for performing the actions of the described methods and systems. These other implementations may each optionally include one or more of the following features.

In another aspect, which may include at least a portion of the subject matter of any of the preceding and/or following examples and aspects, a system for dynamic pairing function optimization is provided. The system comprises one or more processors, memory, and one or more program stored in the memory. The one or more programs comprise instructions for performing the actions of the described methods and systems.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

FIG. 8 illustrates an example scoring matrix, in accordance with one or more embodiments.

DETAILED DESCRIPTION OF PARTICULAR EMBODIMENTS

Figure 1:
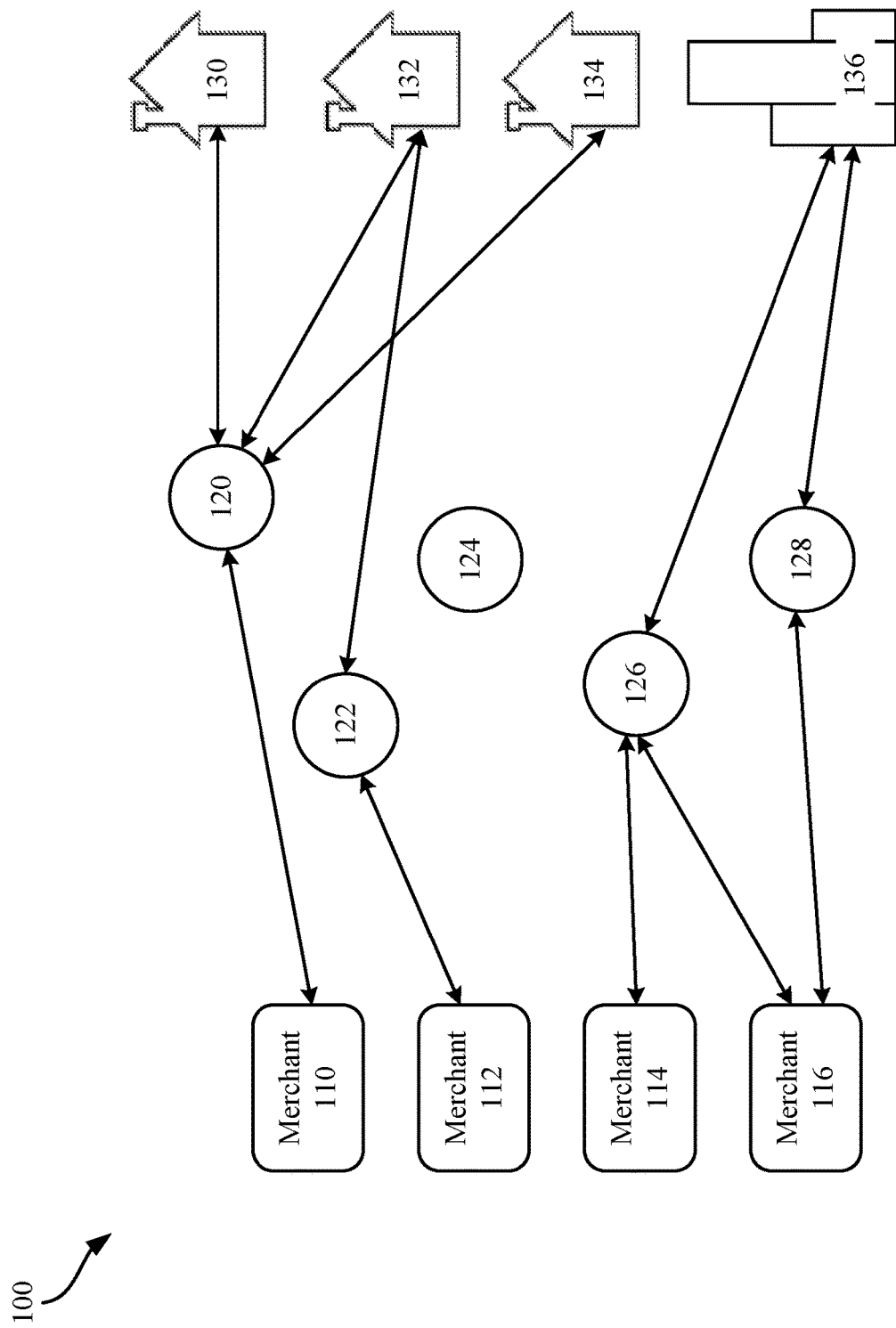
FIG. 1 illustrates one example of a delivery logistics system having multiple merchants, couriers, and customers, in accordance with one or more embodiments.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present invention will be described in the context of particular protocols, such as Wi-Fi or Bluetooth. However, it should be noted that the techniques of the present invention may also be applied to variations of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

With regard to the present disclosure, logistics platforms managing real-time on-demand deliveries of perishable goods rely on efficient pairing of couriers with delivery opportunities to optimize deliveries of orders. This optimizes courier activity, reduces downtime, and speeds up delivery to customers. However, in some embodiments, large order volumes generated every minute may cause the state of the system to change frequently which may cause difficulty in determining the most efficient set of routes for pairing.

According to various embodiments, a system, and associated processes, is provided for optimizing pairings for delivery of perishable goods. A method is provided for pairing a dataset of created orders with a dataset of available couriers. The dataset of created orders may include orders that have been confirmed by the corresponding merchant and the dataset of available couriers may include couriers that are online and actively accepting delivery opportunities. This may be a global dataset chosen from all orders and all couriers in the system, or a regional dataset of orders and couriers.

The dataset of orders and dataset of available couriers may then be sorted into groups based on geographic data items, such as proximity, geohash values, etc. Within each grouping of orders and couriers, feasible pairings may be generated between each courier and each created order by identifying and eliminating infeasible pairings. The infeasible pairings are determined using various constraints such as transportation mode, vehicle type, vehicle size, order size, and ordered items.

Delivery routes are then generated for each feasible pairing and scored based on weighted factors, such as route efficiency, route priority, the projected lateness of the route, the reliability of the route, the fit of the route, and the state effect of the route. A neural network may be implemented to determine the weighted factors by generating estimated time of arrival predictive updates. The scores are then optimized to achieve a maximum score combination for all generated routes. Each route is then selected for the corresponding courier if the courier will arrive at or after the created order is completed by the merchant. In some embodiments, the routes may be offered to the corresponding couriers to accept the delivery pairing. Since more time used for determining route assignments provides additional data for more precise and informed decisions, but also causes delay in deliveries waiting to be offered, a neural network may be trained to predict the optimal selection of orders to couriers for a given amount of time.

In some embodiments, the systems described herein may be structured for the use case of on-demand delivery of perishable goods originating from a third-party merchant which require specific points of acknowledgement. Current approaches to order pairings may simply go through each delivery, select the closest courier in proximity, and make the route pairing. However, this approach only considers the best solution for the current state of the system and does not consider future states of the system. Additionally, it only determines the best pairing for the orders that are considered first, and disregards overall utility of the solution.

Current methods also suffer performance issues and/or race conditions when the number of deliveries is large because deliveries may be looped through one by one, or couriers are selected from the same pool in parallel because it cannot be prevented. Current methods also do not effectively take into account merchant operations, e.g. merchants may not have seen the order, or the order may not be ready when the courier arrives, etc.

The improved systems for optimal assignment of deliveries, described herein, provide for explicit balancing of a number of different metrics as pairing decisions are made while considering the future state of the system. Additionally, sorting the datasets and parallelizing route generation achieve precise and efficient route pairings in a short runtime, allowing for more frequent re-optimization of existing and subsequent orders.

Example Embodiments

With reference to FIG. 1, shown is an example of a delivery logistics system 100 implemented for multiple merchants, couriers, and customers, in accordance with one or more embodiments. As used herein, the term and "delivery logistics system" may be used interchangeably with the terms "logistics platform " or "delivery platform." In the present example, the delivery logistics system 100 is a logistics platform managing real-time, on-demand, delivery of perishable goods. For instance, a customer may order food from a restaurant by using a mobile device application that places the order through the logistics platform. In some instances, the user may also access the delivery platform through the internet via a computer, laptop, tablet, etc. When the customer orders the food through the logistics platform, the order is prepared at a provider site, where a courier will then pick up the order and deliver the order from the provider site to the customer.

As shown in FIG. 1, system 100 includes providers 100, 112, 114, and 116. According to various examples, a provider may be a merchant that prepares perishable goods such as food at a restaurant. Other such merchants may be any combination of one or more of the following: restaurants, bars, cafes, or other vendor of food or beverages, such as a hotel. Such venues may also be referred to herein as HORECA (Hotel/Restaurant/Café) which is a term or abbreviation used to describe entities in the food service industry.

However, in some examples, provider sites may also provide other perishable goods such as floral arrangements, medications, refrigerated or frozen items, live animals, etc. that may need real-time, on-demand delivery to a customer. Accordingly, although various examples in the present disclosure may describe the provider sites and the logistics platform in the context of restaurants and food delivery, the mechanisms and processes described herein may also be applied to the delivery of various other perishable items. As used herein, the terms "provider" and "merchant" may be used interchangeably.

System 100 also includes one or more couriers 120, 122, 124, 126, and 128. Such couriers may be on foot, or traveling by vehicle, such as a car, scooter, bicycle, etc. In various embodiments of system 100, one or more couriers may be directed to one or more merchants to receive an order placed by customers and deliver the orders to the customers located at corresponding destinations 130, 132, 134, or 136, which may be residential or commercial addresses. In some embodiments, the destinations may correspond to a particular geo-location determined by GPS or other coordinate system.

In various embodiments, the delivery platform may determine the estimated time arrival (ETA) of delivery of the order to the customer once the order has been placed. This ETA may be provided to the customer. The ETA of delivery of an order may be estimated based on tracked events or milestones corresponding to the order. As used herein, the terms "events" may be used interchangeably with "milestones." The customer may also be provided with information regarding the status of the order, events, or milestones. The customer may also be provided with other information, such as information corresponding to the courier, etc. Information regarding the status of the order, events, or milestones may also be provided to the merchants and the couriers.

Figure 2:
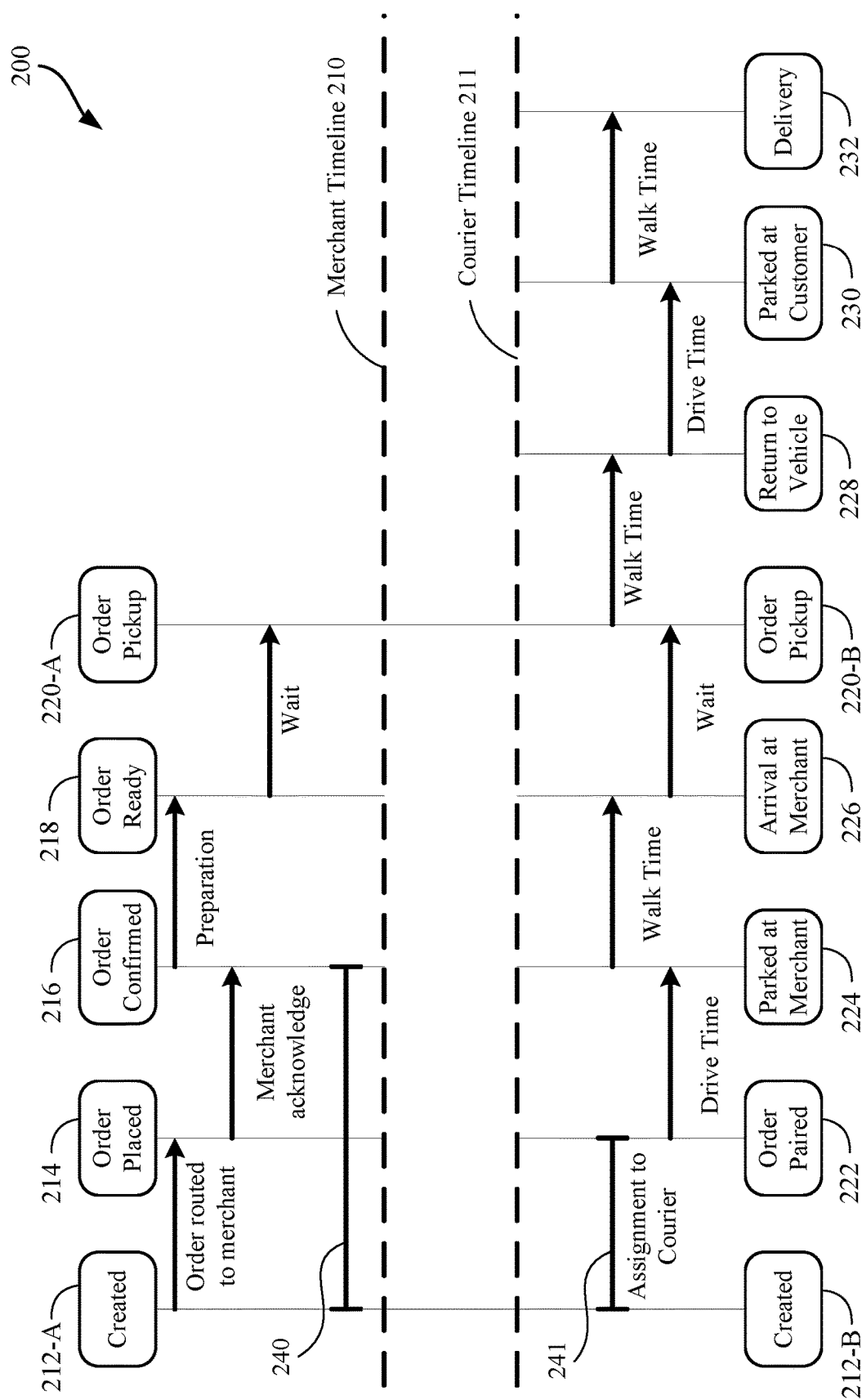
FIG. 2 illustrates an example timeline of delivery events associated with real-time on-demand delivery of perishable goods, in accordance with one or more embodiments.

With reference to FIG. 2, shown is an example timeline 200 delivery events associated with real-time on-demand delivery of perishable goods, in accordance with one or more embodiments. Timeline 200 depicts the various events that occur when an order is placed by a customer on a merchant timeline 210 and a courier timeline 211. In various embodiments, a merchant timeline or courier timeline may include additional or fewer events than depicted in FIG. 2. In various embodiments, the events in timeline 200 may be tracked via transmission between a server system and a client devices associated with one or more couriers, merchants, and/or customers, which may be further described with reference to FIG. 3. As used herein, client devices associated with customers may be referred to as "customer devices," client devices associated merchants may be referred to as "merchant devices," and client devices associated with couriers may be referred to as "courier devices." The server system may implement a dynamic ETA estimation system as further described herein.

The events that occur on a merchant timeline 210 may include order creation 212-A, order placement 214, order confirmation 216, order ready 218, and order pickup 220-A. An order creation 212-A may occur when the system receives an order created by a customer. The order may be received at the server system. The order may then be routed to the designated merchant. In some embodiments, the order is routed to the designated merchant by transmitting information corresponding to the order from the server to a merchant device.

The order placement 214 event may occur when the order is received at the merchant device. In some embodiments, the merchant may acknowledge the receipt of the order by transmitting a confirmation, which may trigger the order confirmation 216 event. Order confirmation 216 may signal that preparation of the order has begun by the merchant. In some embodiments, the period of time between order creation 212-A and order confirmation 216 is known as kitchen latency 240.

An order ready 218 event may then occur when preparation of the items in the order is completed and the order is ready for pickup by a courier. Event 218 may be triggered by a merchant confirmation that the order is ready. Such confirmation may be transmitted by the merchant device to the server. The merchant may then wait for a courier to arrive for pickup of the order. When a courier arrives and picks up the order, the order pickup 220-A event occurs. This event may also be triggered by a merchant confirmation that the courier has received the order.

In some embodiments, the events that occur on a courier timeline 211 may overlap or correspond with one or more events on a merchant timeline 210. The events on courier timeline 211 may include order creation 212-B, order assignment 222, parked at merchant 224, arrival at merchant 226, order pickup 220-B, return to vehicle 228, parked at customer 230, and order delivered 232.

In some embodiments, order creation 212-B may correspond to order creation 212-A, and may occur when the system receives an order created by a customer as in event 212-A. In some embodiments, event 212-A and 212-B may be the same event. The system may then assign the order to a courier, thereby triggering order assignment 222. In some embodiments, order assignment 222 may be triggered by confirmation of acceptance of the order by the courier. The system may transmit a notification to a courier device corresponding to the courier. In some embodiments, the period of time between order creation 212-B and order assignment 222 may be known as assignment latency 241.

When order assignment 222 occurs may depend on various factors, including the distance of the courier from the merchant, the travel time of the courier to the merchant, traffic, time of day, etc. In some embodiments, order assignment 222 may not occur until the order has been confirmed by the merchant at 216 or is being prepared by the merchant. In some embodiments, order assignment 222 may not occur until the merchant has confirmed that the order is ready for pickup at 218. As used herein, an order assignment or delivery assignment may refer to the pairing of an order with a courier and providing the courier with a delivery opportunity to deliver the order to the corresponding delivery destination, which may be accepted or declined by the courier.

Once an order is assigned at 222, the courier may travel to the merchant location to pick up the order. The courier may then pick up the order upon arrival at the merchant location, and trigger order pickup 220-B. Event 220-B may correspond to order pickup 220-A. In some embodiments, event 220-A and 220-B may be the same event. In some embodiments, event 220-B may be triggered by a courier confirmation that the courier has received the order from the merchant.

In some embodiments, the system may attempt to assign orders and route couriers such that the arrival at merchant 226 coincides with order ready 218. This may optimize the actions of the courier and the merchant to minimize down time, which may occur where courier arrives before the merchant has completed the order, or where the merchant has completed the order before the courier arrives.

In some embodiments, additional events may be tracked between the order assignment 222 and the arrival at merchant 226. For example, the courier may travel to the merchant location by vehicle and then park her vehicle in an appropriate location to reach the merchant. In some embodiments, the courier may confirm that the vehicle is parked by transmitting the confirmation from the courier device to the server, thereby triggering parked at merchant 224. The courier may then have to walk or otherwise travel from the parking location to the merchant. An arrival at merchant event 226 may also occur when the courier has arrived at the merchant location. A confirmation of the courier's arrival may be sent by the courier device and/or the merchant device. In various embodiments, tracking these additional events may provide more accuracy of ETA predictions between order assignment 222 and arrival at merchant 226.

In some embodiments, the courier may have to wait for the order to be completed. After order pickup 220-B, the courier may then travel to the customer location to complete delivery of the order at order delivery 232. Order delivery 232 may occur when the order has been given to the customer. Order delivery 232 may be triggered by confirmation of the delivery by the customer or the courier via corresponding devices.

In some embodiments, additional events may be tracked between the order pickup 220-B and the order delivery 232. For example, the courier may confirm the return to a vehicle after order pickup 220-B at the merchant location. This may be done via confirmation transmitted from the courier device to the server. In some embodiments, confirmation may be manually input or automatically detected via a proximity beacon. For example, the systems used to determine the location of a courier may implement Bluetooth Low Energy (BLE) beacons and BLE-enabled devices that are capable of detecting signals emitted by the BLE beacons.

By using BLE beacons and devices, the system can provide more accurate location information of a delivery courier and can avoid the drawbacks of GPS, cell tower triangulation, and manual location entry. Specifically, the system can be used when there are weak or nonexistent GPS or cell signals. The system also detects location automatically without requiring any input from a delivery courier. As described in examples of various mechanisms and processes herein, the use of BLE beacons and BLE-enabled devices to provide location services yields increased efficiency and accuracy, in addition to other benefits, for a logistics platform managing real-time, on-demand, deliveries of perishable goods.

As another example, the courier may then park her vehicle in an appropriate location to reach the customer. In some embodiments, the courier may confirm that the vehicle is parked by transmitting the confirmation from the courier device to the server, thereby triggering parked at customer event 230, similar to the parked at merchant event 224. The courier may then have to walk or otherwise travel from the parking location to the customer location. An arrival at customer event (not shown) may also occur when the courier has arrived at the customer location before delivery of the order.

In various embodiments, the tracking of events or milestones may provide guidance to an assignment or routing algorithm to efficiently route couriers. For example, by generating ETA predictions for various events, as described above, may allow for more optimal pairing of deliveries with couriers for on-demand delivery of perishable goods originating from third party merchants which require specific points of acknowledgement.

Figure 3:
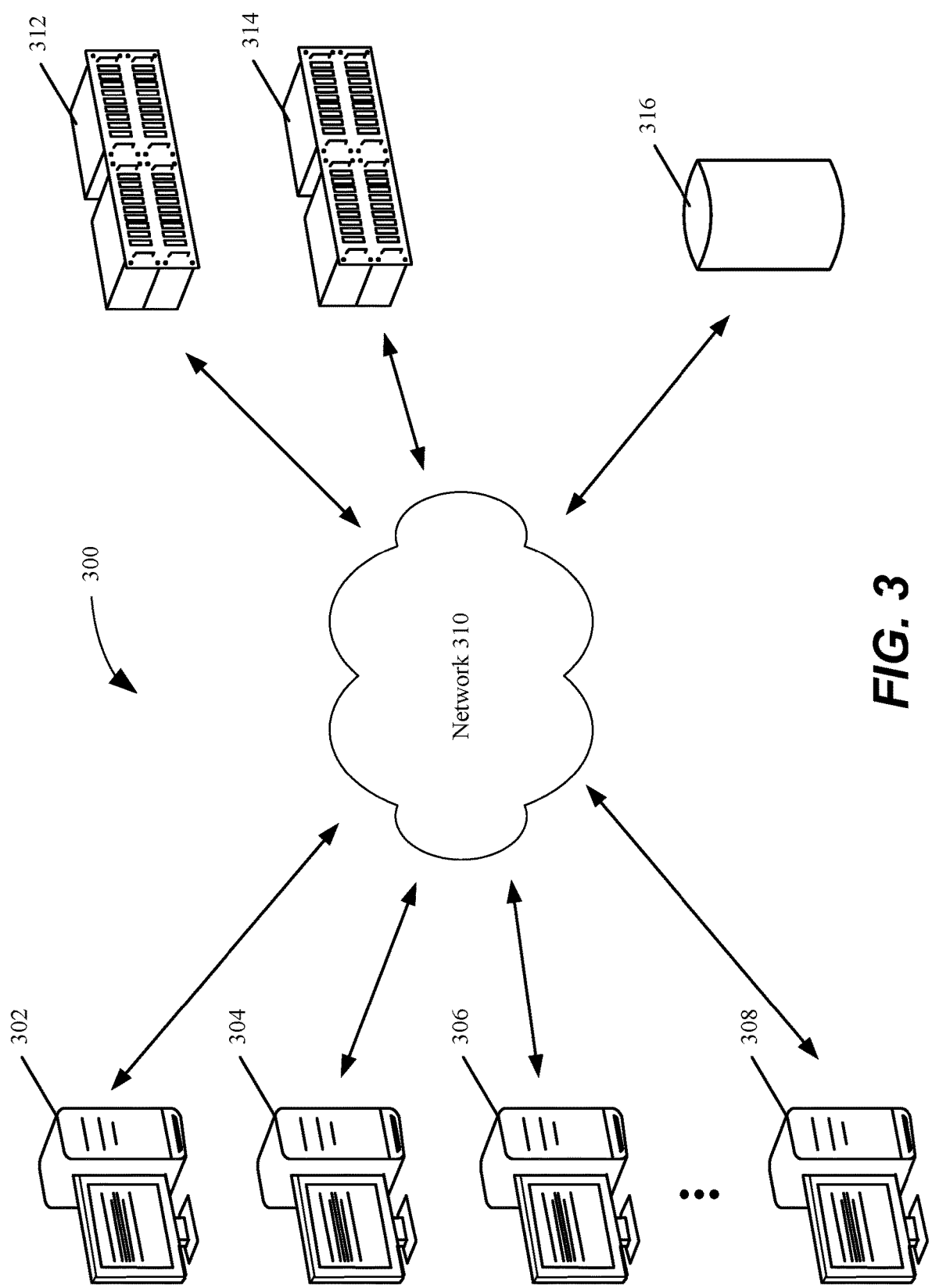
FIG. 3 illustrates a diagram of an example network architecture for implementing various systems and methods of the present disclosure, in accordance with one or more embodiments.

In various embodiments, one or more of the events described herein may be transmitted to a client devices corresponding to customers, merchants, or couriers. FIG. 3 illustrates a diagram of an example network architecture 300 for implementing various systems and methods of the present disclosure, in accordance with one or more embodiments. The network architecture 300 includes a number of client devices 302-308 communicably connected to one or more server systems 312 and 314 by a network 310. In some embodiments, server systems 312 and 314 include one or more processors and memory. The processors of server systems 312 and 314 execute computer instructions (e.g., network computer program code) stored in the memory to perform functions of a network data exchange server. In various embodiments, the functions of the network data exchange server may include routing real-time, on-demand, delivery of perishable goods, and/or predicting and dynamically updating estimated time of arrivals (ETAs) for such deliveries.

In some embodiments, server system 312 is a content server configured to receive and store network profile information. In some embodiments server system 314 is a dispatch server configured to transmit and/or route network data packets including network messages. In some embodiments, content server 310 and dispatch server 312 are configured as a single server system that is configured to perform the operations of both servers.

In some embodiments, the network architecture 300 may further include a database 316 communicably connected to client devices 302-308 and server systems 312 and 314 via network 310. In some embodiments, network data, or other information such as user information, courier information, and merchant information, may be stored in and/or retrieved from database 316.

Users of the client devices 302-308 access the server system 312 to participate in a network data exchange service. For example, the client devices 302-308 can execute web browser applications that can be used to access the network data exchange service. In another example, the client devices 302-308 can execute software applications that are specific to the network (e.g., networking data exchange "apps" running on smartphones).

Users interacting with the client devices 302-308 can participate in the network data exchange service provided by the server system 312 by distributing digital content, such as text comments (e.g., updates, announcements, replies), digital photos, videos, online orders, payment information, activity updates, location information, or other appropriate electronic information. In some implementations, information can be posted on a user's behalf by systems and/or services external to the network or the server system 312. For example, the user may post a review of a movie to a movie review website, and with proper permissions that website may cross-post the review to the network on the user's behalf. In another example, a software application executed on a mobile device, with proper permissions, may use global positioning system (GPS) capabilities to determine the user's location and automatically update the network with his location (e.g., "At Home", "At Work", "In San Francisco, Calif.").

In some implementations, the client devices 302-308 can be computing devices such as laptop or desktop computers, smartphones, personal digital assistants, portable media players, tablet computers, or other appropriate computing devices that can be used to communicate with an electronic social network. In some implementations, the server system 312 can include one or more computing devices such as a computer server. In various embodiments, each of client devices 302-308 may be any one of merchant devices corresponding to merchants 110-116, courier devices corresponding to couriers 120-128, or customer devices corresponding to customers 130-136.

In some implementations, the server system 312 can represent more than one computing device working together to perform the actions of a server computer (e.g., cloud computing). In some implementations, the network 310 can be a public communication network (e.g., the Internet, cellular data network, dial up modems over a telephone network) or a private communications network (e.g., private LAN, leased lines).

Various customers, merchants, and couriers may transmit information related to one or more orders to the servers 312 or 314 via corresponding client devices. As previously described, such information may include order information, payment information, activity updates, timestamps, location information, or other appropriate electronic information. The system may utilize this transmitted information to batch orders and determine optimal routes to couriers for pickup and delivery of order for perishable goods.

Figure 4A:
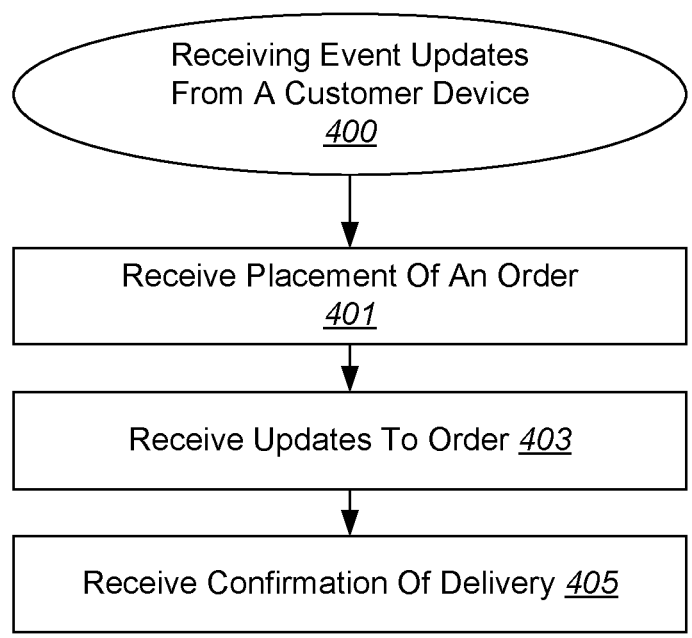
FIGS. 4A, 4B, and 4C illustrate example processes for processing of various events and timestamps using weight factors, in accordance with one or more embodiments.
Figure 4B:
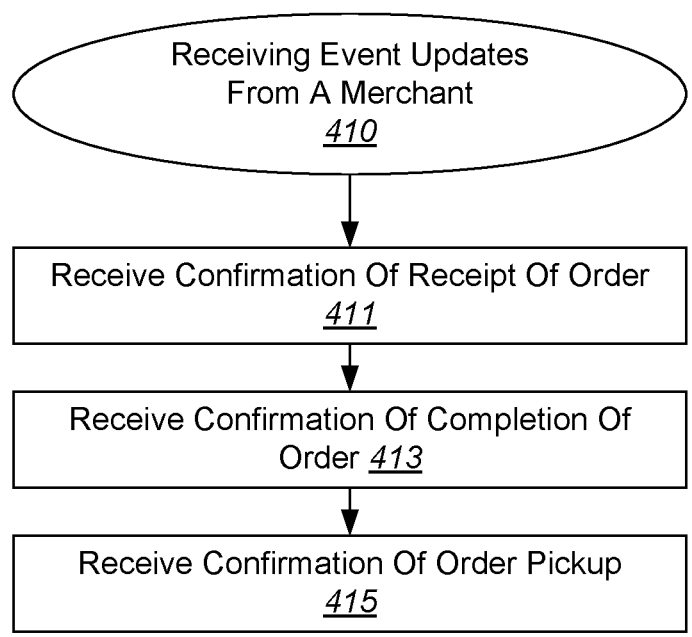
Figure 4C:
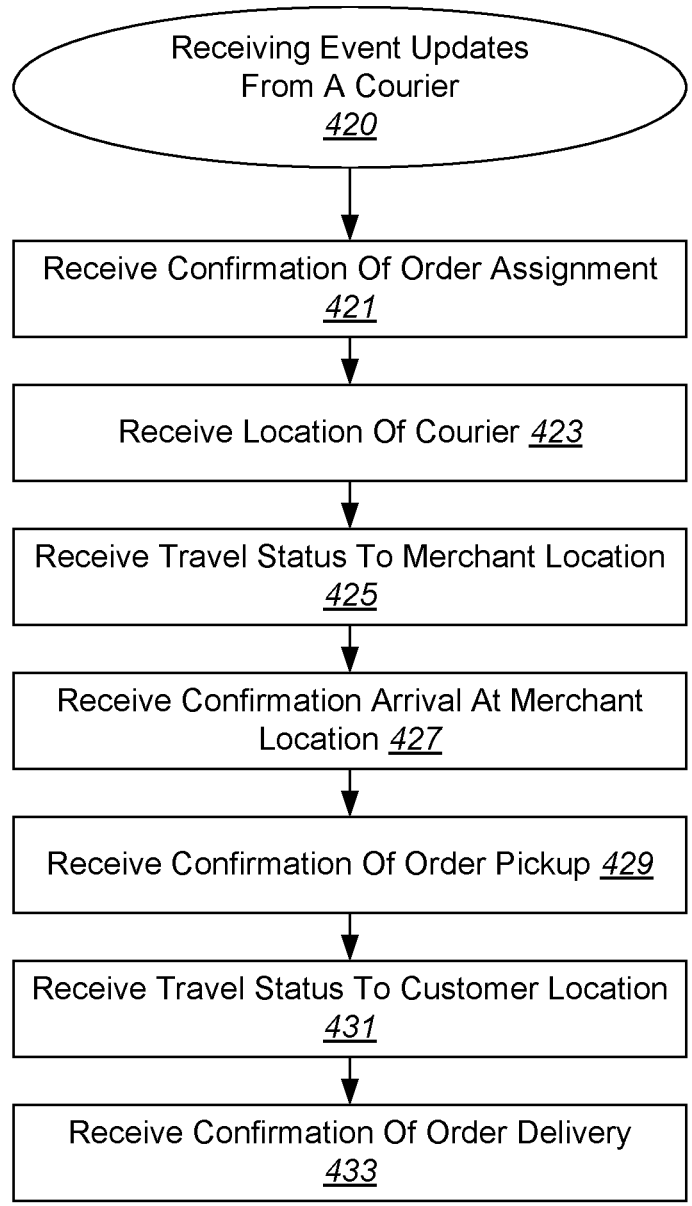

The system may also utilize information transmitted by client devices to servers 312 or 314 to calculate the ETA of the delivery of the order, as well as dynamically updating the ETA when updated timestamps are received. With reference to FIGS. 4A-4C, shown are example methods for receiving multiple events and timestamps, in accordance with one or more embodiments.

FIG. 4A depicts an example flow chart of an example process 400 for receiving event updates from a customer device. At 401, a placement of an order is received. In some embodiments, an order may be placed by a customer on a corresponding customer device, such as 302-308. In some embodiments, the order may be places in a web browser or an application installed in the customer device. The order information may be transmitted via network 310. The order placement may include location information corresponding to the location for delivery of the order. For example, location of the customer device may be determined via GPS. As another example, the location information may include an address corresponding to the customer. Order placement may further include additional information, such as ordered items, payment information, and other customer information. In some embodiments, the receipt of an order at 401 may correspond to the order creation event 212-A and/or 212-B.

In some embodiments, updates to the order may be received at 403. In some embodiments, order updates may include addition or removal of various items in the order, cancellation of the order, changes in delivery location, etc. In some embodiments, updates to the order may be factored into the predicted ETA of order delivery. In some embodiments, a confirmation of delivery may be received from the customer device at 405. For example, the customer may transmit a confirmation of delivery via the customer device once the order is received from the courier. However, in some embodiments, confirmation of delivery may be transmitted by the courier via a corresponding courier device, as further described with reference to FIG. 4C. In some embodiments, receiving updates to the order may be an optional implementation.

FIG. 4B depicts an example flow chart of an example process 410 for receiving event updates from a merchant device. A confirmation of receipt of order may be received at 411. In some embodiments, an order may be routed over network 310 by the system to the merchant device associated with the appropriate merchant. The merchant may then transmit a confirmation of receipt of the order, which may trigger the order confirmation event 216. In some embodiments, the confirmation of receipt order at 411 may be automatically transmitted via network 310 to the system 312 once the order has been successfully routed to and received by the merchant device.

Once the merchant has completed the preparation of the order, a confirmation of completion of order may be received at 413. The confirmation of completion of order may trigger the order ready event 218. A confirmation of order pickup may then be received at 415 and trigger the order pickup event 220-A. The merchant may transmit the order pickup confirmation via the merchant device once the courier has picked up the order. However, in some embodiments, confirmation of order pickup may be transmitted by the courier via a corresponding courier device, as further described with reference to FIG. 4C.

FIG. 4C depicts an example flow chart of an example process 420 for receiving event updates from a courier device. At 421, a confirmation of order assignment may be received. In some embodiments, the confirmation of order assignment may be an acceptance of the order assignment input by the courier on the courier device. At 423, the location of the courier may be received. In some embodiments, the location of the courier may be tracked and updated in real time. In some embodiments, the location of the courier may be tracked via the courier device, such as by using real-time GPS coordinates. In some embodiments, the location of the courier may be additionally tracked using proximity beacons.

In various embodiments, the courier may travel to the merchant location after order assignment 222. As the courier travels to the merchant location, the travel status to the merchant location may be received at 425. In various embodiments, the travel status may include the status of the vehicle corresponding to the courier. For example, the courier device may transmit a notification to the server system that the courier has parked his vehicle near the merchant location. This may correspond to the parked at merchant event 224.

Upon the courier's arrival at the merchant location, a confirmation of arrival at merchant location may be received at 427. In some embodiments, the confirmation of arrival at merchant location may be a check-in status update input by the courier on the courier device and transmitted via network 310. Once the order is provided to the courier, a confirmation of order pickup may be received at 429. In some embodiments, the confirmation of order pickup may be confirmed by the courier via the courier device. As previously described, the confirmation of order pickup may additionally, and/or alternatively, be confirmed by the merchant via the merchant device.

In various embodiments, the courier may travel to the customer location after order pickup 220-B. As the courier travels to the customer location, the travel status to the customer location may be received at 431. In various embodiments, the travel status may include the status of the vehicle corresponding to the courier. For example, the courier device may transmit a notification to the server system that the courier has returned to the vehicle after the order pickup. This may correspond to the return to vehicle event 228. As another example, the courier device may transmit a notification to the server system that the courier has parked his vehicle near the customer location. This may correspond to the parked at customer event 230.

Next, a confirmation of order delivery may be received at 433 from the courier device. In some embodiments, the confirmation of order delivery may be confirmed by the courier via the courier device. As previously described, the confirmation of order delivery may additionally, and/or alternatively, be confirmed by the customer via the customer device.

In some embodiments, processes 400, 410, and 420 may be integrated within a single process. In some embodiments, the described system may receive additional or fewer event updates than depicted in FIGS. 4A-4C.

In some embodiments, the travel status of the courier at various points in timeline 200 may be tracked via a proximity system, which includes one or more beacons. Various systems and processes for determining the location of a courier using proximity sensors and/or beacons are described in U.S. patent application Ser. No. 15/826,737 titled IMPROVING PREDICITONS BY USING BEACONS IN A REAL-TIME LAST MILE LOGISTICS PLATFORM by Hsieh et al., filed on Nov. 30, 2017, which application is incorporated by reference herein in its entirety and for all purposes.

For example, BLE beacon sensors may be placed in the courier's vehicle, which may be configured to detect a beacon device corresponding to the courier location. In some embodiments, the beacon device may be a client device associated with the courier. Additionally, beacon sensors may be located at one or more merchant locations. In some embodiments, the courier device may include the beacon sensor and beacon devices may be located at the courier's vehicle or various merchant locations. As the courier, and the corresponding courier device, travels toward and away from various beacons, the location real-time location of the courier may be tracked.

For example, if it is detected that the distance between the courier and the courier's vehicle increases after order pairing 222, but before order pickup 220-B, then it may be determined that the courier has parked the vehicle and is moving toward the merchant location. As another example, the courier may be determined to be walking toward the merchant location via proximity sensors located at one or more nearby merchant locations, as well as the target merchant location, which are configured to detect the beacon device corresponding to the courier's location. Arrival at merchant 226 may also be determined when the courier device is brought within a predetermined radius of a beacon sensor at the merchant location.

The travel status of the courier may also be tracked after order pickup 220-B and before order delivery 232. If it is detected that the distance between the courier and the merchant location increases, then it may be determined that the courier is leaving the merchant location and traveling toward the vehicle. As another example, once the courier moves within a predetermined radius of the vehicle, the proximity sensors may determine that the return to vehicle event 228 has occurred, and an additional travel status to customer location may be received at 431. Subsequently, if it is detected that the distance between the courier and the courier's vehicle increases, then it may be determined that the courier has parked the vehicle and is moving toward the customer location to deliver the order.

Additionally, after order delivery 232 occurs, the proximity system may determine that the courier has returned to the vehicle when the courier has traveled within a predetermined radius of the vehicle. This may indicate that the courier is ready to be given another order assignment. In various embodiments, other events indicating travel status of the courier to the merchant may be tracked at 425 and 431.

Figure 5:
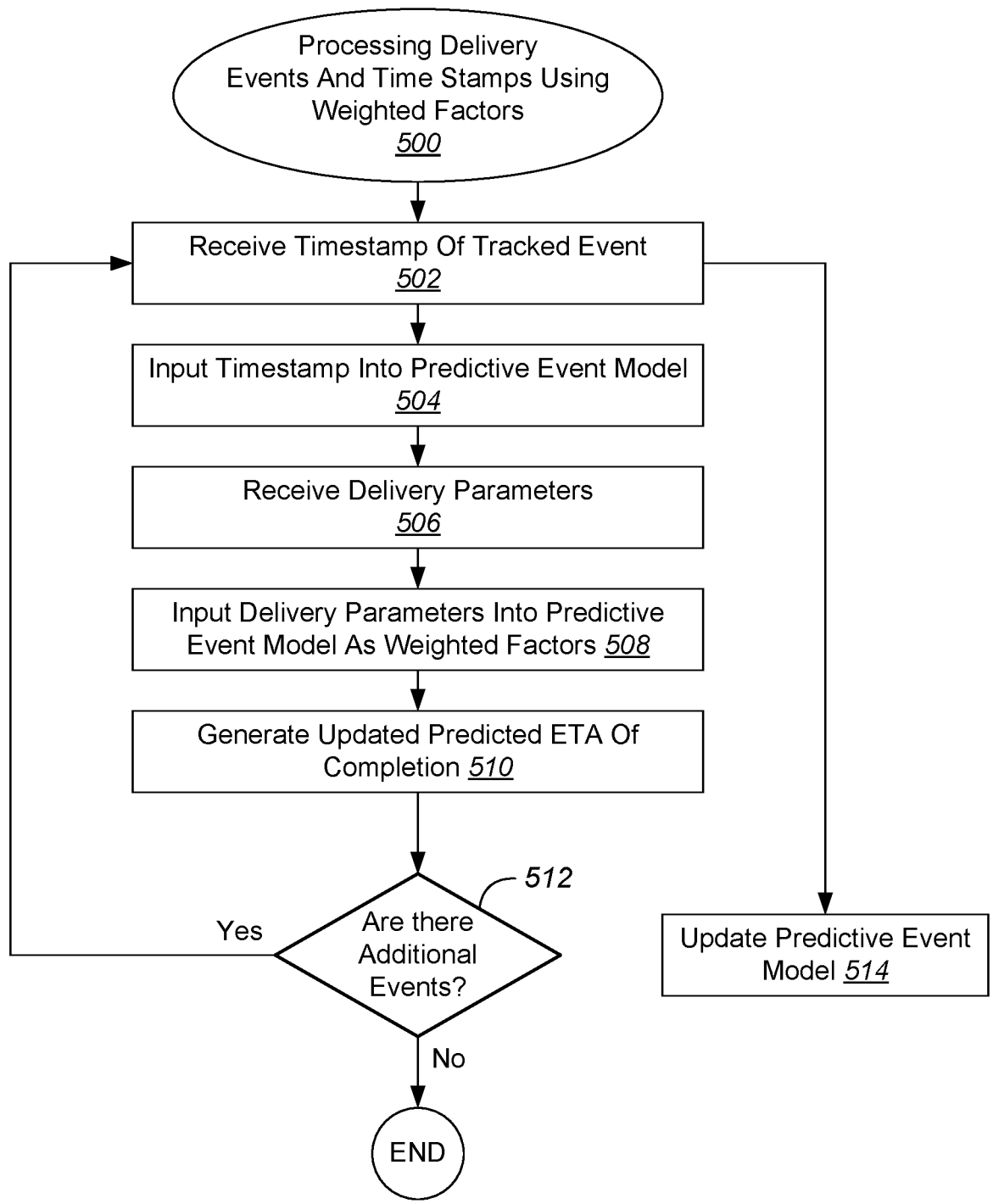
FIG. 5 illustrates a method for dynamic estimated time of arrival predictions, in accordance with one or more embodiments.

FIG. 5 illustrates and example process 500 for processing of delivery events and timestamps using weighted factors, in accordance with one or more embodiments. At 502, a timestamp of an event corresponding to an order is received. In various embodiments, the order may be an order placed by a customer via a customer device. In some embodiments, the event may be any one of events described with reference to FIG. 2, and received as described with reference to FIGS. 4A-4C.

At 504, the timestamp is input into a corresponding predictive event model. In some embodiments, a neural network is implemented to generate an estimated time of arrival (ETA) for a particular order. Such systems may learn (or progressively improve performance) to do tasks by considering examples, generally without task-specific programming, such as generate accurate ETA predictions. In some embodiments, the neural network provides a predictive model to input a timestamp associated with an event and generate predictive ETAs for one or more subsequent delivery events.

In some embodiments, the neural network may comprise a plurality of subnetworks, each of which function as a predictive event model to generate an estimated length of time for a particular interval of time between subsequent delivery events. As used herein, the terms "subnetwork" and "event model" may be used interchangeably, unless otherwise noted. In some embodiments, each interval between events, such as those events illustrated in FIG. 2, may be associated with a subnetwork. In other words, a particular predictive event model may predict a duration between one event to the next, as shown in FIG. 2.

At 504, delivery parameters corresponding to the order are received. Delivery parameters may include various factors or measurements that may affect the length of time between one or more tracked events. In various embodiments, delivery parameters may include time, date, traffic, weather, historical courier performance, and size of markets. Delivery parameters may further include the number of orders received, the number of items in an order, the type of dishes in an order, the sub-total of an order, the historical restaurant data. In various embodiments, various other parameters may be implemented in the neural network.

At 508, the delivery parameters are input into the corresponding predictive event model as weighted factors. In various embodiments, the neural network may be trained to correlate the various parameters with particular effects on time durations between successive events. The neural network may assign weights to such parameters creating weighted factors. Such weights may be adjusted based on actual time of arrivals.

For example, certain dates may fall on holidays that are historically known to be busy days. Thus, certain holidays may be correlated with increased traffic or increased number of orders placed. Additionally, certain times of the day may be associated with heavier traffic, such as during rush hours. In some embodiments, the time of day is a parameter that is continuously updated in real-time and input into the neural network.

In some embodiments, traffic information may be tracked in real-time. In some embodiments, traffic information may be tracked by a third party application. In some embodiments, traffic data is updated in real-time, or constantly updated in near real-time.

Parameters corresponding to weather may also inform traffic or order impact. For example, inclement weather may correlate with heavier traffic due to hazardous conditions. Inclement weather may also correlate with more orders placed since customers may be more likely to stay indoors. Weather parameters may also correspond to change in demands for particular food types. For example, more ice cream may be ordered during hot days.

In some embodiments, the size of markets may correspond to the number of individuals in a certain market who are potential customers, couriers, and/or merchants of a product or service. As used herein, the term market may be used to mean either a particular merchant, or a group of merchants associated with a particular product type. However, in some embodiments, the term market may refer to the total customers, couriers, and/or merchants in a given area that is part of the on-demand logistics platform. The neural network may identify particular market sizes as correlated with certain differences in times for order preparation or delivery. The size of markets may also correspond to new and more mature markets. For example, a newer market may be correlated with longer order preparation times, while more mature markets may be correlated with faster order preparation times.

Another input parameter may include fleet load factor, which corresponds to the ratio of number of orders outstanding to the number of couriers outstanding. In some embodiments, the higher this ratio of fleet load factors may correspond to an insufficient number of couriers, and thus longer time durations for events after order ready 218.

In some embodiments, the item types in an order may be input as parameters. For example, certain dishes may be correlated with particular preparation times. In some embodiments, the size of an order may be input as predictive parameters. In some embodiments, more items within an order may correlate to longer preparation times. In some embodiments, the sub-total price of an order may also correspond to order size or order preparation time. For example, a larger sub-total may correlate to a larger amount of items within the order. Additionally, more expensive items may take longer to make, due to more ingredients, more difficulty, or more specialization in preparation.

In some embodiments, the neural network may determine the average rate for time durations between one or more events on a courier timeline 211 for couriers in a given predetermined area. Similarly, in some embodiments, the neural network may determine the average rate for time durations between one or more events on a merchant timeline 210 for a particular merchant. However, historical performance may also be input as parameters.

The historical performance of a courier may be a record of the previous time durations between one or more events on courier timeline 211 for a particular courier. This record may be compared to the average time durations between one or more events on courier timeline 211 for all couriers within a given area. The neural network may use this factor to assign a particular state variable to a given courier to adjust predictions accordingly. For example, a given courier may have shorter time durations between particular events, such as between parked at merchant 224 and arrival at merchant 226, as compared to the average for a given area. The neural network may adjust the ETA prediction for arrival at merchant 226 accordingly for this particular courier.

The historical performance of a particular merchant may also be input. This may include the average time duration between events on merchant timeline 210 for that particular merchant. The neural network may use this factor to assign a particular state variable to a given merchant to adjust predictions accordingly. For example, the average time for a particular merchant to prepare a particular item may be tracked and determined. As an example, some merchants may not transmit a confirmation of receipt of order, such as at step 411, but instead immediately begin preparation of the order. Once the order has been complete, the merchant may then transmit the confirmation of receipt of order and confirmation of completion of order simultaneously. The neural network may determine an ETA prediction accordingly such that a delivery routing system may appropriately route a courier at the optimal time.

In some embodiments, historical performance parameters may be organized into aggregate units for a predetermined amount of time. For example, the historical performance of a courier or merchant for the previous thirty (30) day increment is given higher weighted values. In some embodiments, the historical performance parameters for days occurring before the previous thirty (30) days are also input with lower weighted values. In some embodiments, the historical performance parameters for days occurring before the previous thirty (30) days may be discarded.

In various embodiments, weights assigned to particular parameters may be updated based on other parameters. For example, the weight given to traffic may be adjusted in real-time as the time changes from peak rush hour to after rush hour. In some embodiments, one or more parameters may cause the neural network to maintain a particular state variable.

At 510, an updated predicted estimated time of arrival (ETA) is generated. The parameters and timestamp are input into various computational layers of the subnetwork. In some embodiments, such computational layers may include, but are not limited to, linear layers, convolution layers, deconvolution layers, residual layers, quadratic layers, etc. In some embodiments, the timestamp of an event, or actual time of arrival (ATA) for the event, is input into one or more computational layers of a predictive model to output a predicted ETA for the delivery of the order, such as order delivery 232.

In other embodiments, the ATA of an event is input into one or more computational layers to output a predicted ETA for a subsequent delivery event. Then, the output predicted ETA is input into additional computational layers of another predictive model to determine additional predicted ETAs for additional delivery events. In some embodiments, each computational layer in a subnetwork may correspond to one or more parameters.

In some embodiments, a predicted ETA may be generated for each event on timelines 210 and 211. In some embodiments, the predicted ETAs for one or more events may be transmitted to various client devices, such as customer devices, merchant devices, and courier devices. The predicted ETAs may further be used for delivery routing system for assignment of orders to couriers and merchants for delivery.

This approach divides the delivery process into distinct delivery events that are more predictable because they depend on unique features of the merchant, such as order protocol, food preparation speed, etc. Furthermore, the disclosed system provides increased capability of receiving the timestamp data for each delivery event through various applications and devices. Thus, there is a natural way to incorporate real-time updates to ETA predictions based on events that take place during a delivery.

At 512, it is determined whether additional events exist for the delivery. If an ATA for the final event, such as order delivery 232, has been received, then process 500 ends. However, if additional events exist, then process 500 returns to operation 502 to receive the timestamp of a subsequent event. The timestamp of the subsequent event may be used by the neural network to train itself by comparing the timestamp of the subsequent event with the predicted ETA at 514.

At 514, a corresponding event model is updated. In some embodiments, the processor dynamically generates the plurality of ETA time durations by continuously training a predictive event model using the plurality of weighted factors. In various embodiments, the weights may also be adjusted based on timestamps corresponding to ATAs of various delivery event updates that are received as described in FIGS. 4A-4C. When an event update is received, the neural network may compare the ATA with the predicted ETA for a particular event and analyze and differences. Based on the comparison, the neural network may update weights given to particular parameters to account for any differences between the predicted ETA and the received ATA for an event. As such, the predictive models in the neural network of the dynamic ETA prediction system are continuously being trained during operation.

Figure 6:
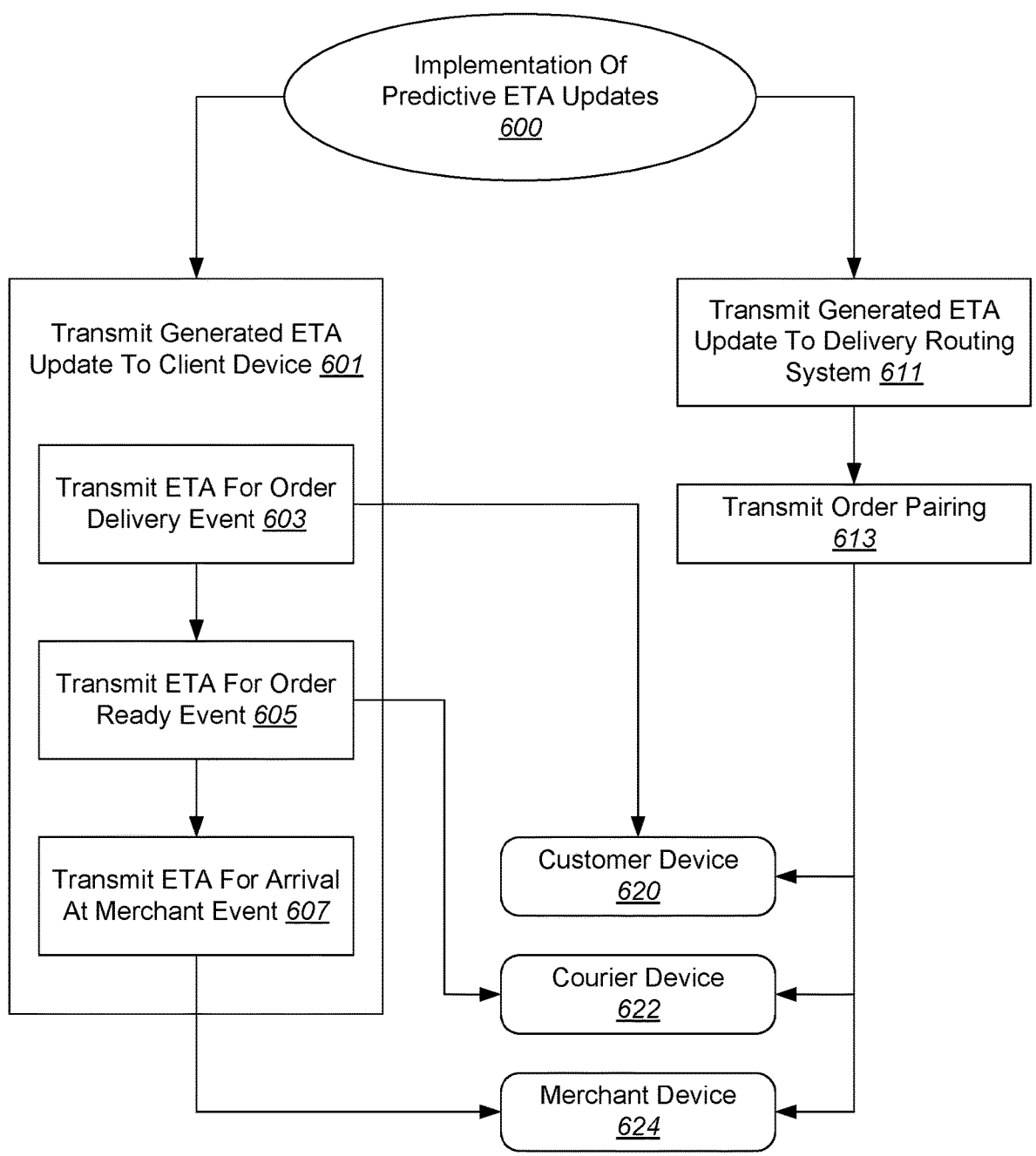
FIG. 6 illustrates an example flow process for implementation of predictive ETA updates, in accordance with one or more embodiments.

FIG. 6 illustrates an example flow process 600 for implementation of predictive ETA updates, in accordance with one or more embodiments. As previously described, the described systems may generate predictive ETA updates for one or more delivery events, including completion of the order by the restaurant, pickup of the order by the courier, and completion of delivery of perishable goods to the customer. Such predictive ETA updates may be transmitted to various client devices at 601. As shown in FIG. 6, such client devices include customer device 620, courier device 622, and merchant device 624. Client devices 620, 622, and 624 may be any one of client devices 302-308, as shown in FIG. 3.

For example, at step 603, a predicted ETA for order delivery 232 may be provided to the customer device 620. As another example, at step 605, the predicted ETA for order ready 218 may be provided to the courier device 624 to notify the courier that it is ready for pickup. As a further example, at 607, the predicted ETA for arrival at merchant 226 may be provided to the merchant device 624 to notify the merchant when to expect a courier to arrive. One or more predicted ETA updates for various other events may be transmitted to any one of client devices 620, 622, and 624.

The disclosed systems may also provide a delivery routing system with timestamps necessary to make informed decisions on when deliveries should be offered to a courier. In some embodiments, the predicted ETA updates are transmitted to a delivery routing system at step 611. Such delivery routing system may input the ETA updates into a pairing algorithm to offer couriers a plurality of received orders. In some embodiments, the delivery routing system may offer subsequent orders to a courier based on the predicted ETAs for various events. For example, a subsequent order may be offered to a courier that is currently en route to a customer location based on the predicted ETA for the order delivery 232. In some embodiments, the pairing of a subsequent order may also depend on the predicted ETA of the order ready event 218 of the subsequent order, as well as distance and travel time parameters of the courier to the merchant corresponding to the subsequent order.

In various embodiments, at step 613, the order pairing may be transmitted to a customer device 620 to notify the customer of information corresponding to the courier, such as identification, contact information, etc. In some embodiments, the order pairing may be transmitted to the courier device 622 to notify the courier of information corresponding to the merchant and/or customer, such as location, contact information, order information, etc. In some embodiments, the order pairing may be transmitted to the merchant device 624 to notify the merchant of information corresponding to the customer and/or courier, including contact information.

In some embodiments, the delivery routing system may offer multiple orders to the same courier. For example, multiple orders being delivered to customer locations that are within a predetermined distance may be offered to the same courier to optimize a travel route for delivery. In some embodiments, the predicted ETAs for order ready events 218 of such multiple orders may be input to determine whether a single courier should be offered the opportunity to pick up the multiple orders.

Additionally, it provides a method for pinpoint issues to determine which part of a delivery went wrong by comparing predicted and actual event timestamps. In some embodiments, the plurality of ETA time durations may be used to escalate issues and determine which part of a delivery went wrong by comparing predicted and actual event timestamps. For example, any large discrepancies between predicted ETAs and ATAs for events in a delivery may be identified to pinpoint where delays occurred amongst the delivery events, as well as identify major causes for delays. For example, for a particular delivery, the greatest discrepancy between predicted ETA and ATA may be identified for the parked at merchant event 224. If multiple instances of such discrepancy occur for multiple couriers, the cause may be identified as a lack of parking areas near such merchant. Once identified, this issue may be appropriately addressed to further optimize deliveries.

Various other methods of generating dynamic ETA predictive updates using neural networks are described in U.S. patent application Ser. No. 15/798,207 titled SYSTEM FOR DYNAMIC ESTIMATED TIME OF ARRIVAL PREDICTIVE UPDATES (Attorney Docket No. DASHP001) by Han et al., filed on Oct. 30, 2017, which application is incorporated by reference herein in its entirety and for all purposes.

Figure 7:
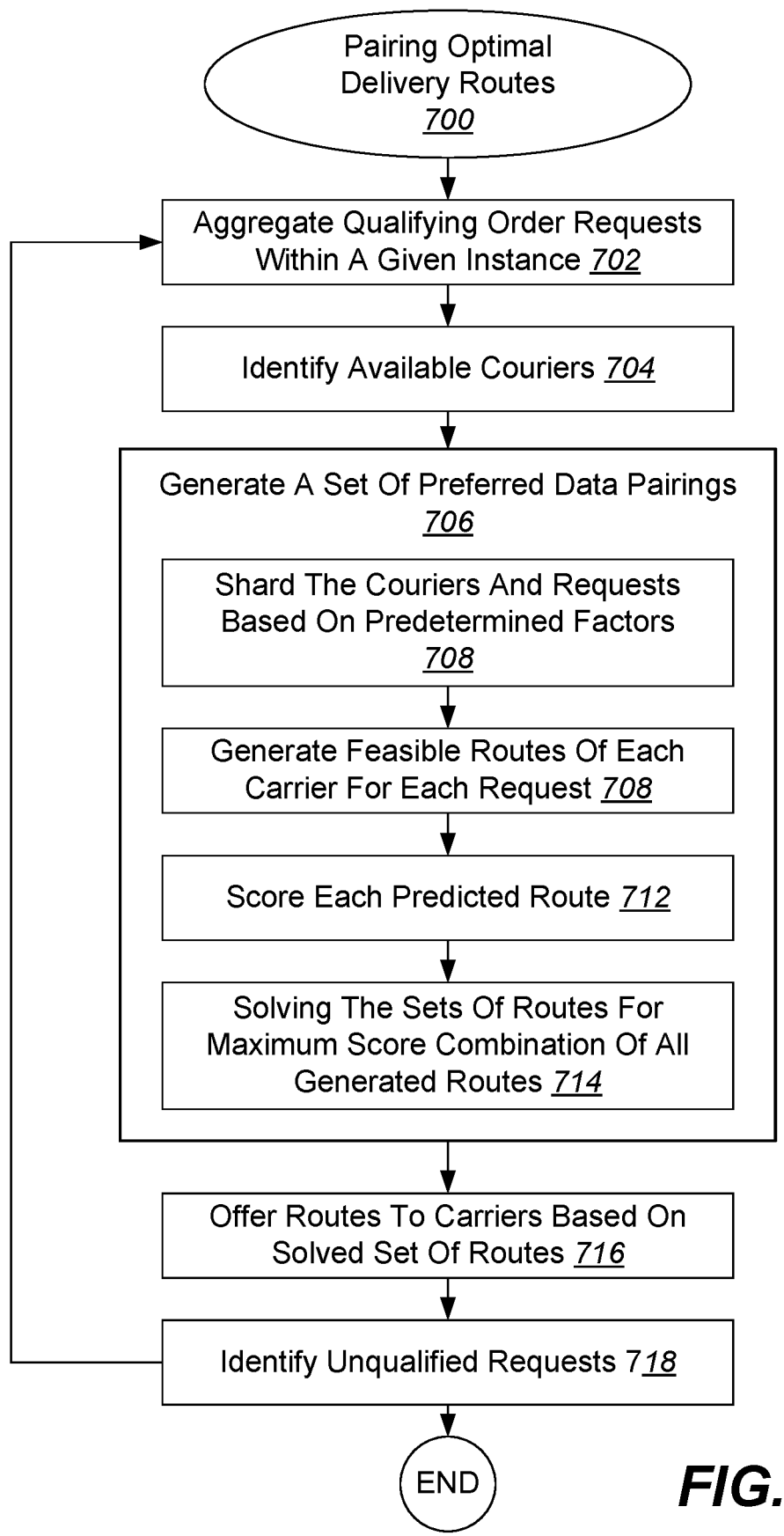
FIG. 7 illustrates an example process for pairing optimal delivery routes, in accordance with one or more embodiments.

The described systems and methods may also utilize information transmitted by various client devices to servers, as well as generated ETA predictive updates for pairing of optimal routes to couriers for pickup and delivery of order for perishable goods. With reference to FIG. 7, shown is a process 700 for pairing optimal delivery routes. At 702, qualifying order requests within a given instance are aggregated. In some embodiments, a first filtered data set is received at the server. The first data set may correspond to a orders created for real-time deliveries of perishable goods from merchants. For example, the orders received by various customers in system 300 may be collected and transmitted to a delivery routing system.

The first dataset may be filtered by a time threshold and a confirmation milestone. The confirmation milestone corresponds to confirmation of receipt of a corresponding order by a corresponding merchant. For example, the first filtered data set of orders may be filtered such that only orders with a corresponding order confirmed event 216 are included. In some embodiments, the time threshold may correspond to a predicted time interval to the completion of preparation. For example, various ETA predictions generated by methods and systems previously described above may be used to estimate the order ready 218 event for each confirmed order in the first dataset.

Using the estimated time that each order will ready (218), the predicted time interval may be determined and used to filter out orders with preparation times greater than a predetermined threshold. Thus, the first filtered dataset includes a set of orders that have each been confirmed by the merchant and include an estimated preparation time that is shorter than a predetermined threshold. However, in other embodiments, additional, or different, parameters may be used to filter the orders in the first filtered dataset.

At 704, available couriers are identified. In some embodiments, a second filtered dataset is received at the server, which corresponds to a plurality of available couriers. The second filtered dataset may be filtered by an active status threshold. This active status threshold may correspond to a courier being online and actively accepting delivery offers. For example, a courier may sign in or log on to an application on the corresponding courier device to indicate that the courier is ready to be offered orders. Other couriers who are not online and actively accepting delivery assignments are filtered out of the second dataset.

In various embodiments, the couriers may also be filtered by geographic location. For example, GPS data received from courier devices may be used to locate each courier and filter out couriers that are located outside of a predetermined active region are filtered out of the second dataset. In some embodiments, the geographic areas may be fixed with a given radius that defines the active region. In some embodiments, the active region may expand to include a greater area during times of high order volumes. For example, an active region may double in area during high order volumes to include additional couriers in the second dataset to meet demand.

In other embodiments, the active region may correspond to the merchant locations of orders included in the first filtered dataset. For example, multiple areas may be determined using a predetermined radius around each merchant corresponding to aggregated order requests. Then an active region may be created from all of these areas. In some embodiments, the active region may be disconnected or comprise multiple separated sub-regions.

In yet other embodiments, the active region may change dynamically based on the concentration of available couriers. For example, the active region may be expanded or contracted to include active couriers such that a desired ratio of available couriers within the active region to orders created is maintained. In some embodiments, a minimum threshold may be set for the ratio of orders created to available couriers. In some embodiments, the active region may be modified based on number of orders at a given time. For example, the active region may be similarly expanded or contracted to include additional or fewer orders created included in the first filtered dataset at operation 702.

In some embodiments, active couriers in the first filtered dataset may be filtered by geographic location using a geohash coordinate system to define the active region. In a geohash coordinate system, the latitude and longitude coordinates may be geocoded by correlating them with a specific code, which may be known as a geohash. Thus, a geohash serves as a convenient way of expressing a location (anywhere in the world) using a short alphanumeric string, with greater precision obtained with longer strings. In some embodiments, a geohash may identify a rectangular cell, with each extra character identifying one of 32 sub-cells. The geohash may be represented as alphanumeric characters (32 bit encoded), with each 5 bits converted to one character. In other embodiments, other types of encoding may be used.

In some embodiments, an active region may be represented by a geohash. In some embodiments, this geohash may represent a rectangular cell in which one or more merchants corresponding to the orders in the first filtered dataset are located. In some embodiments, multiple smaller geohashed rectangular cells may be used to represent the active region. In some embodiments, all active couriers located within the geohashed rectangular cell may be included in the second filtered dataset.

If the desired ratio of available couriers to orders created is too low, then the alphanumeric characters of the geohash may be shortened to create a larger active region to potentially capture more active couriers to include in the second filtered dataset. The geohash may be shortened multiple times until an adequate amount of active couriers are included within the active region.

Conversely, if the desired ratio of available couriers to orders created is too high, then the geohash may be lengthened to shrink the active region to a smaller area around the merchant locations. The geohash may be lengthened multiple times until an adequate amount of active couriers are included within the active region. However, in other embodiments, no action may be taken if the desired ratio of available couriers to orders created is too high to ensure a surplus of active couriers in the second filtered dataset.

This allows the geographic area to be easily expanded or contracted based on the demand or concentration of couriers. Such geohashed coordinates may also be implemented for shard sorting the union of the first dataset and the second dataset for dynamic region grouping of order requests, as further described with reference to operation 708 and FIG. 9.

At operation 706, a set of preferred data pairings are generated from the first and second filtered datasets. In various embodiments, a preferred data pairing may include a courier from the first dataset and an order requests from the second dataset. In some embodiments, generating the set of preferred data pairings may include inputting the first and second filtered dataset into a trained neural network to automatically predict projected time values and expected time values based on trained factors including vehicle type, vehicle size, order size, type of food, etc. In some embodiments, the neural network may be the neural network implemented to generate an ETA predictive updates, as described above.

Generating sets of preferred data pairings from the first and second filtered datasets may comprise shard sorting the couriers and order requests based on predetermined factors, at operation 708. In some embodiments, the union of the first dataset and the second dataset are shard sorted into a plurality of sorted groups. The shard sorting may be based at least partially on geographic data associated data values in the first and second datasets.

In some embodiments, geographic data associated data values may refer to an instance of geo-coordinates which may comprise a pair of numerical values indicating latitude and longitude of a physical location or area. In addition, the terms "geographic data item," and "geographic data associated data value" may be used interchangeably and refer to an instance of geo-coordinates found in network traffic, which may identify the geo-location of various couriers, merchants, and/or customers.

The plurality of geographic data associated data values may be extracted from a plurality of network traffic flows associated with client devices, such as shown in FIG. 3. The plurality of network traffic flows may include passive observations of network traffic. The geographic data associated data values may be associated with the location of the corresponding transmitting client device.

The geographic data associated data values may additionally include one or more of the following: geographic proximity between a real-time location of a courier and a location of a pick-up location corresponding to an order, regional boundaries, supply and demand conditions, and historical courier data.

Thus, the proximity of current location of couriers and merchant locations may be used to divide the orders and active couriers in the first and second datasets into sorted groups. For example, the merchant locations corresponding to the orders placed in the first dataset may be grouped by sub-region. In some embodiments, sub-regions may be arbitrarily selected. However, in other embodiments, orders and couriers may be grouped by other factors, such as regional boundaries like freeways, rivers, neighborhood boundaries, etc. For example, merchants corresponding to the created orders may be grouped into sub-regions defined by roads such that the sub-regions may correspond to recognized neighborhoods.

Other factors for sorting the datasets include historical courier data which may indicate familiarity with particular areas. For example, a courier that has picked up orders from a particular area or merchant may be grouped with a set of orders, even if another courier is closer in geographic proximity to the order pickup location.

In various embodiments, the first and second dataset may be sorted using supply and demand conditions. The geographic data items may include geohashes, as previously described above. Shard sorting may use geohashes to generate the sorted groups. For example, sub-regions may be defined by rectangular cells corresponding to geohash values of a particular length. The created orders in the second dataset may be sorted into groups based on the geohashed areas in which the corresponding merchants are located.

The size of the rectangular cells may be predetermined. However, in some embodiments, various sizes of rectangular cells may be used in different areas. For example, in busier locations or locations with high density of restaurants and other merchants, smaller rectangular cells may be defined by longer geohash strings.

Figure 9:
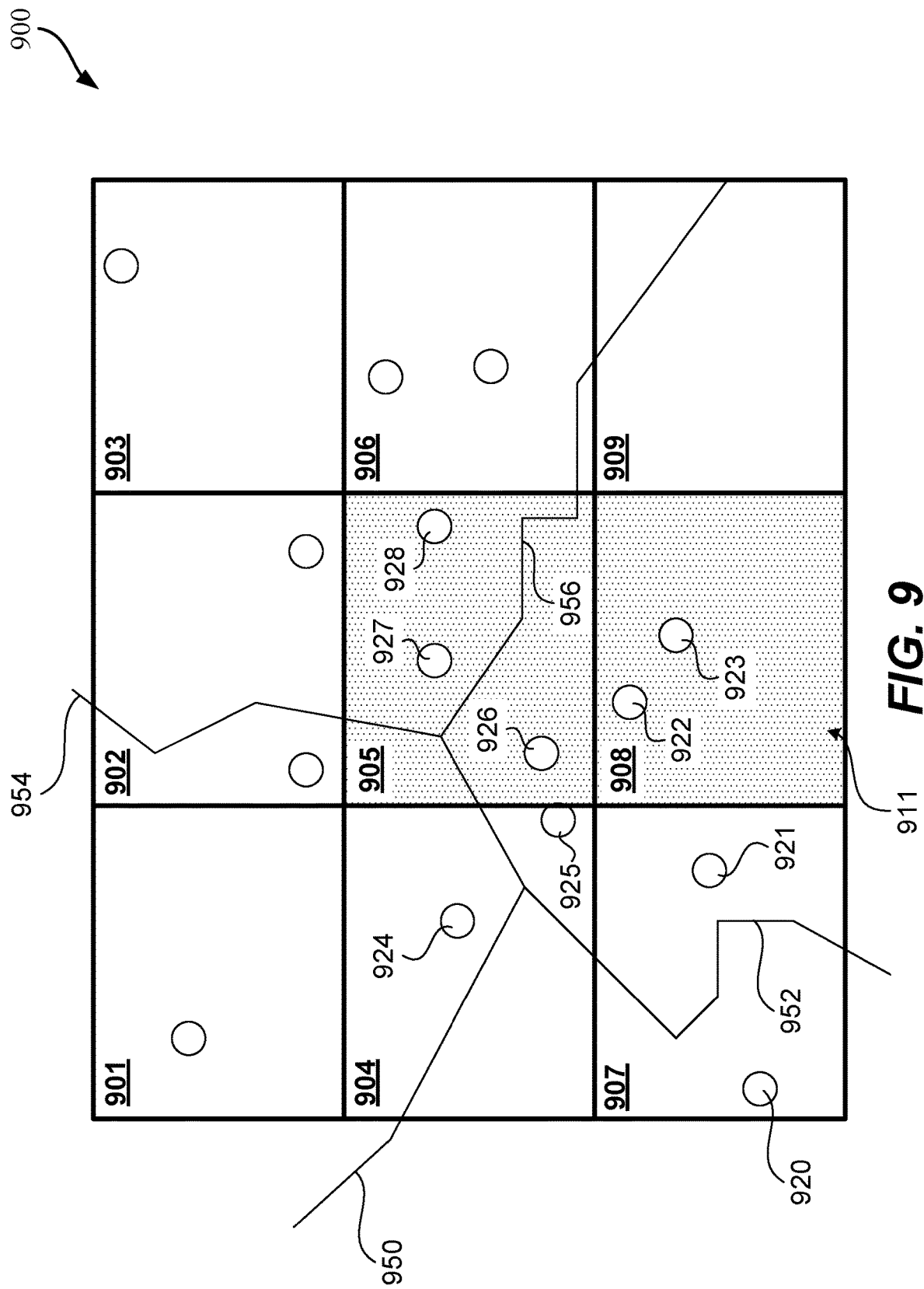
FIG. 9 illustrates an example of a geohash coordinate map that can be implemented with various embodiments of the present disclosure.

In some embodiments, each active courier in the second filtered dataset may include a location defined by geohashes of the same length as the geohashes defining the sub-regions. With reference to FIG. 9, shown is an example geohash coordinate map 900 that can be implemented with various embodiments of the present disclosure. Map 900 displays a geographic area including roads 950, 952, 954, and 956. The locations of various active couriers are also depicted in FIG. 9 as circles, including the locations of couriers 920-928. The geographic area may be divided into rectangular areas 901 to 909, each of which is defined by geohash values with a precision of a particular number of characters. Such characters may be a binary code, alphanumeric 32-bit code, or other appropriate code. For example, each rectangular area in FIG. 9 may correspond to a binary geohash code with a length of twenty-five (25) characters, which may define an area of approximately 4.89 kilometers by 4.89 kilometers.

In an example, rectangles 905 and 908 may correspond to shaded sub-region 911 coded by a binary geohash code with a length of twenty-four (24) characters. Active couriers in the first dataset and merchants corresponding to created orders in the second dataset that include the same geohash value as sub-region 911 may be sorted into the same group. As shown, couriers 922, 923, 926, 927, and 928 are sorted into the group.

However, if the number of available couriers is low relative to the number of created orders in a sorted group, shorter geohash strings may be used for the couriers in order to enlarge the defined area and include additional active couriers in the sorted group. For example, a predetermined minimum ratio of five couriers to four orders may be desired for each grouping to ensure that there are enough couriers are available to pick up completed orders. If there are 6 orders in the sorted group, then more couriers are needed to satisfy the constraint. Couriers in neighboring geohashed areas may be included in the sorted group, such as couriers 924 and 925 in rectangle 904 and/or couriers 920 and 921 in rectangle 907.

In contrast, in some embodiments, where the ratio of active couriers to created orders in a sorted group is too high geohash strings corresponding to active couriers may be lengthened in order to reduce the number of active couriers included in the sorted group. For example, the sorted group may only include couriers within rectangle 905 to include only couriers 926, 927, and 928.

Then for each sorted group, feasible routes of each courier are generated for each request at operation 710. Within each sorted group, the possible data pairings are identified between a first data value from the first dataset and a second data value from the second dataset. The second data value may correspond to a courier and other associated courier information, such as vehicle type, location, historical performance, etc. The first data value from the first dataset may correspond to a created order and other associated order information, such as ordered items, order subtotal, customer identification, merchant identification, order placement time, etc.

Couriers within the sorted group may then be paired with the created orders in that group. In some embodiments, the possible data pairings are filtered to eliminate infeasible pairings from a set of feasible pairings. The infeasible pairings may be determined using various factors as constraints, such as transportation mode, vehicle type, vehicle size, order size, and type of food, ordered items, and other information associated with the data values. For example, an order that includes an extra-large pizza as an order item would not be a feasible pairing with a courier using a bicycle as transportation. As another example, orders for temperature sensitive goods may only be paired with couriers with refrigeration capabilities. In some embodiments, all possible feasible pairings are generated in parallel. Infeasible pairings may be determined based on additional constraints including one or more of the following: vehicle type, vehicle size, order size, and type of food.

In some embodiments, possible routes associated with each feasible pairing are generated. In some embodiments, routes are generated based on road distances on a map. Such routes may be generated using mapping information stored on a local database or a global database on network 300. In some embodiments, a route may simply be a straight line distance from the courier location to the order location. In some embodiments, routes for all feasible pairings are generated in parallel.

By intelligently shard sorting the datasets at operation 708 and parallelizing route generation at operation 710, high-quality results that include more precise time predictions and more efficient route pairings may be achieved in very short run-times (as short as 20 seconds or faster). This may allow more frequent re-optimization of unpaired couriers and orders, as well as minimize or reduce delays to deliveries caused by computational run-time.

At 712, each predicted route is scored. In some embodiments, a score is computed for each feasible pairing. In various embodiments the score of a particular route may be based on a combination of one or more factors, including route efficiency, route priority, the projected lateness of the route, the reliability of the route, the fit of the route, and the state effect of the route. Each factor may be assigned a score based on predetermined variables. In some embodiments, the assigned scores may be weighted or unweighted.

The route efficiency may correspond to how fast a courier may complete the delivery of the order along the generated route. This may be estimated based on historical courier performance data, as well as real-time traffic information and other geographic data items. In some embodiments, vehicle type may also be considered. For example, a motorcycle or scooter may be assigned a higher score than a car for particular routes because a motorcycle may be able to split lanes in heavy traffic.

The route priority may correspond to how soon an order will be ready for pickup. In other words, the route priority may correspond to the predicted ETA of the order ready event 218 for that order. As previously described, the predicted ETAs of order ready events 218 for the created orders may be generated by a system for dynamic ETA predictive updates. In some embodiments, orders with earlier order ready events 218 are assigned higher scores.

The projected lateness of the route may correspond to the difference in time between the estimated delivery time projected by the route and the estimated delivery time, such as delivery event 232, which may be predicted by a system for dynamic ETA predictive updates described herein. In some embodiments, the estimated delivery time projected by the route may be determined based on real-time traffic information and other geographic data items. This may also be determined based on historical courier performance data. In some embodiments, if the projected route delivery time is later than the predicted ETA for delivery 232, then the route may be assigned a lower score. By contrast, if the projected route delivery time is earlier than the predicted ETA for delivery 232, then the route may be assigned a higher score. In some embodiments, the estimated delivery time projected by the route may be compared to a predetermined time threshold. If the projected delivery time is beyond the time threshold, the route may be given a zero score.

The reliability of the route may correspond to the variance around the estimation for each point along the route. This may also correspond to the probability that the courier will complete the delivery by the estimated delivery time projected by the route. In some embodiments, historical route data may be used to determine the reliability of a route. For example, if a particular generated route may have include one or more individual route segments. Each route segment may include historical travel durations based on previously paired routes and tracked courier performances. The previous travel durations for each segment may be compared and a standard deviation may be determined. A route with a more segments including larger standard deviations may correspond to a less reliable route and given a lower score.

The fit of the route may correspond to how well the route fits the courier, which may be based on vehicle type, vehicle capacity, historical courier performance, etc. The state effect of the route may correspond to the effect of the route on the balance of supply and demand with regards to available couriers and created orders in the system. For example, a route that would bring a courier into an area where more couriers are needed may be scored higher. In various embodiments, other factors may be considered in addition to the aforementioned.

In some embodiments, the factors are scored and weighted to achieve a route score for each feasible pairing. In some embodiments, the routes are scored in a matrix for optimization, further described below with reference to operation 714. With reference to FIG. 8, shown is an example scoring matrix 800, in accordance with one or more embodiments. As depicted, scoring matrix includes a sorted group of three created orders (delivery 810, delivery 812, and delivery 814) and four couriers (courier 820, courier 822, courier 824, and courier 826).

As shown the first column of scores may correspond to pairings of delivery 810 and the four available couriers. Delivery 810 may be an infeasible pairing with courier 820 and marked with an "X" in the matrix. The pairing of delivery 810 and courier 822 includes a score of "3," the pairing of delivery 810 and courier 824 includes a score of "2" and the pairing of delivery 810 and courier 826 includes a score of "2."

The second column of scores may correspond to the pairings of delivery 812 with the four available couriers. The pairing of delivery 812 and courier 820 includes a score of "2," the pairing of delivery 812 and courier 822 includes a score of "2," the pairing of delivery 812 and courier 824 includes a score of "5," and the pairing of delivery 812 with courier 826 includes a score of "1."

The third column of scores may correspond to the pairings of delivery 814 with the four available couriers. The pairing of delivery 814 and courier 820 includes a score of "1," the pairing of delivery 814 and courier 822 includes a score of "4," the pairing of delivery 814 and courier 824 includes a score of "1," and the pairing of delivery 814 and courier 826 includes a score of "1."

At 714, the sets of routes are optimized for the maximum score combination of all generated routes. In various embodiments, the system may determine the combination of routes that maximizes the total score subject to a constraint that all deliveries are paired to exactly one courier. Not all couriers may receive a route pairing since each delivery may only be delivered by one courier. A mathematical solver may be implemented to solve for the set of feasible pairings that maximizes the sum of scores across all pairings.

Using the example in FIG. 8, delivery 812 may have a preferred pairing with courier 824, while deliveries 810 and 814 may have a preferred pairing with courier 822. In this case, in order to maximize the total score of the pairings in a sorted group, delivery 814 may be paired with courier 822, and delivery 812 may be paired with courier 824. Delivery 810 may be paired with courier 826 since the scores for those pairings are tied at "2." This optimization would result in a maximum score of "11." Delivery 810 is not paired with courier 822 because doing so would only provide a maximum score of "9."

The above example shows global optimization to achieve the highest score in the aggregate. However, in some embodiments, the route scores may be optimized for the best score for each order or for each courier. This may be known as greedy optimization. In such an example, optimization may determine the combination of routes such that each delivery pairing includes the highest score possible. Thus the pairing of delivery 812 and courier 824 would be selected with the highest score of "5" for that delivery. However, delivery 814 and delivery 810 both include preferred scores with courier 822. However, greedy optimization may favor the pairing of delivery 814 and courier 822 because it has a higher score than the pairing of delivery 810 and courier 822. Thus, delivery 810 would be paired with courier 826. Although this results in the same result as global optimization, its method of optimization is different.

This scoring, as described, may provide for explicit balancing of a number of different metrics as pairing decisions are made. It may also provide an intuitive lever to adjust pairings according to current system needs. In addition, it allows for a continuous trade-off between variables, so there are no arbitrary thresholds that completely alter pairing decisions.

The more time used for determining route pairings provides additional data to make more precise and informed route scoring for a greater global optimum score. However, it may also delay the deliveries that are waiting to be offered. In some embodiments, the neural network is trained to predict the optimal pairings of orders to couriers for a given amount of time. There may be a length of time where the pairing delays may cause route scores to decrease in the aggregate. Thus, an optimal trade-off point may exist between aggregating information and committing to a pairing. The neural network is thus able to determine when to make route pairings and when to continue sort additional couriers and orders into groups for scoring.

At 716, routes are offered to couriers based on the optimized set of routes. In various embodiments, the corresponding feasible pairings are offered if a projected time value for a route is greater than or equal to an expected perishable good ready time value. In some embodiments, the projected time value for a route corresponds to the estimated time that the courier corresponding to the route will arrive at the merchant and wherein the expected time value corresponds to the completion of preparation of an order by the merchant. In other words, the route for a particular pairing is selected only where the ETA of the courier's arrival at merchant 226 occurs at or after the ETA of the order ready event 218. This eliminates any wait time that may occur if the courier arrives before the order is ready for pickup and functions to optimize the courier activity.

For routes where the courier is projected to arrive (event 226) before the food ready time (event 218), the pairing is not made. Instead, these unqualified requests are identified at operation 718. In some embodiments, if the projected time value for a route is not greater than or equal to the expected time value, the order and the courier corresponding to the feasible pairing are marked for reconsideration in generating a set of preferred data pairings. Method 700 may then return to operation 702 to reconsider the marked orders and couriers along with additional orders and couriers for pairing and optimization in a subsequent run through operations 702 to 718.

Figure 10:
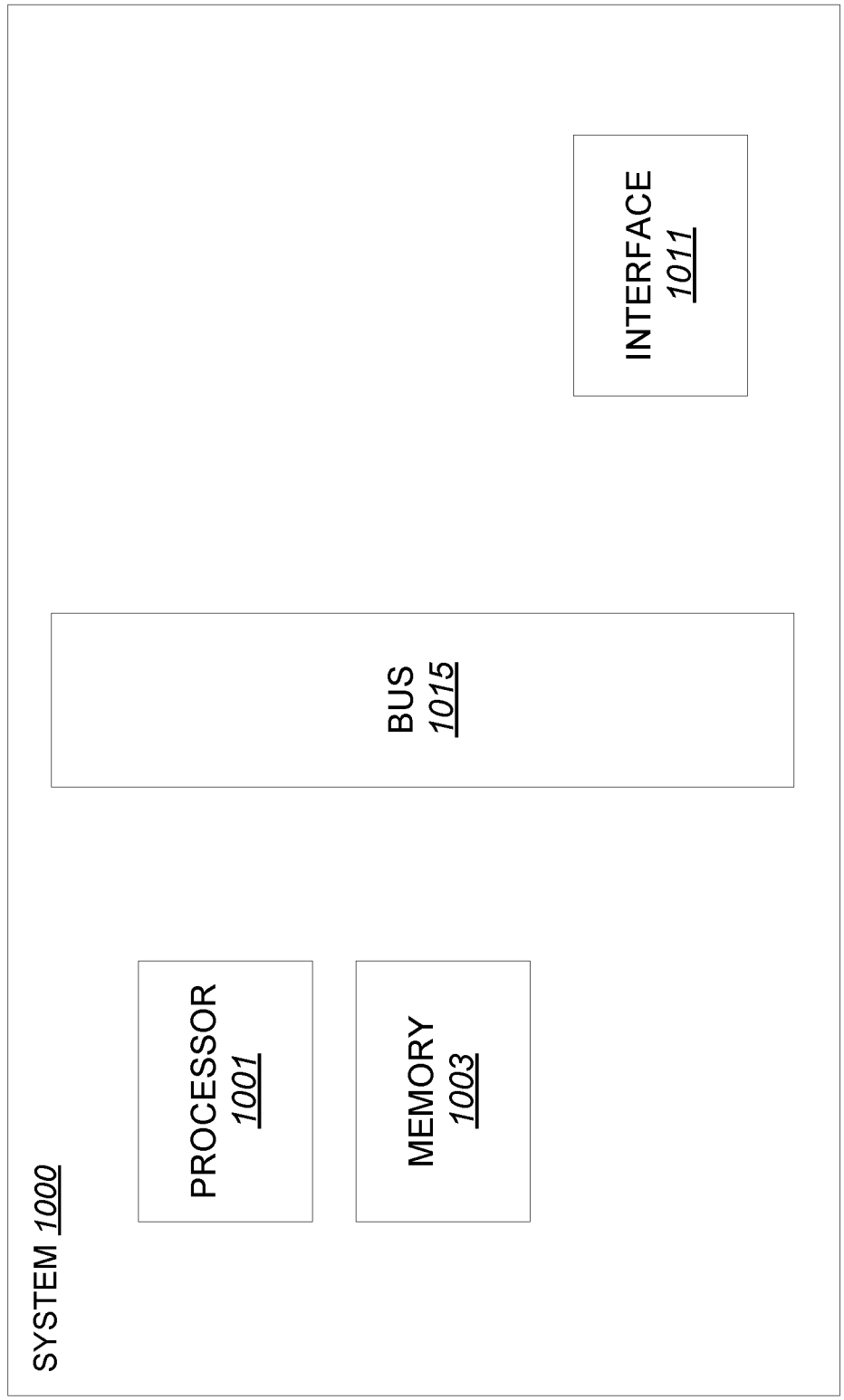
FIG. 10 illustrates a particular example of a computer system that can be used with various embodiments of the present disclosure.

Various computing devices can implement the methods described. For instance, a mobile device, computer system, etc. can be used to generate dynamic ETA predictive updates. With reference to FIG. 10, shown is a particular example of a computer system 1000 that can be used to implement particular examples of the present disclosure. According to particular example embodiments, a system 1000 suitable for implementing particular embodiments of the present disclosure includes a processor 1001, a memory 1003, an interface 1011, and a bus 1015 (e.g., a PCI bus). When acting under the control of appropriate software or firmware, the processor 1001 is responsible for processing inputs through various computational layers and algorithms in a neural network. In some embodiments, the processor is responsible for updating the parameters of each computational layer using algorithms, including but not limited to, a stochastic gradient descent algorithm and a back propagation algorithm. Various specially configured devices can also be used in place of a processor 1001 or in addition to processor 1001.

The complete implementation can also be done in custom hardware. The interface 1011 is typically configured to send and receive data packets or data segments over a network. Particular examples of interfaces the device supports include Ethernet interfaces, frame relay interfaces, cable interfaces, DSL interfaces, token ring interfaces, and the like. The interface 1011 may include separate input and output interfaces, or may be a unified interface supporting both operations. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1000 uses memory 1003 to store data and program instructions for operations including training a neural network, generating delivery routes, and/or generating ETA predictions. The program instructions may control the operation of an operating system and/or one or more applications, for example. The memory or memories may also be configured to store received metadata and batch requested metadata. The memory or memories may also be configured to store data corresponding to parameters and weighted factors.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method for dynamic pairing function optimization, the method comprising:
    receiving a plurality of orders created for real-time deliveries of perishable goods from a plurality of merchants, wherein each order is received from a user device, each user device corresponding to a customer;
    receiving a confirmation message for one or more orders of the plurality of orders, wherein each confirmation message is received from a merchant device corresponding to a merchant associated with a respective order;
    generating a first filtered dataset including one or more orders of the plurality of orders, wherein each order in the first filtered dataset is filtered by a time threshold and a confirmation milestone indicating a receipt of a respective confirmation message;
    generating a second filtered dataset corresponding to a plurality of available couriers, wherein each available courier in the second filtered dataset is filtered by an active status threshold corresponding to a login message received from a courier device associated with the available courier;
    receiving geographic data items from the courier devices corresponding to the plurality of available couriers, the geographic data items including geohashed coordinate values indicating locations of the courier devices;
    shard sorting a union of the first filtered dataset and the second filtered dataset into a plurality of sorted groups such that each sorted group includes respective orders from the first filtered dataset and respective available couriers from the second filtered dataset, wherein the shard sorting is based at least partially on a geographic region corresponding to geographic data items in the first filtered dataset and the second filtered dataset;
    dynamically adjusting a size of the geographic region by adjusting a length of a defining geohashed coordinate value to include available couriers associated with geohashed coordinate values that correspond to the defining geohashed coordinate value in order to provide a desired ratio of respective available couriers to respective orders in each sorted group; and
    for each sorted group:
    identifying possible data pairings between respective orders from the first filtered dataset and respective available couriers from the second filtered dataset,
    determining feasible pairings by filtering the possible data pairings to eliminate infeasible pairings wherein infeasible pairings are determined using factors including transportation mode;
    generating routes associated with each feasible pairing,
    scoring each feasible pairing based on weighted factors,
    determining a set of preferred pairings comprising a combination of feasible pairings that maximizes a sum of scores across all feasible pairings, and
    for each preferred pairing, transmitting a route pairing notification to the respective courier device associated with the available courier that corresponds to the preferred pairing, wherein the route pairing notification provides an offering of the preferred pairing and an associated route at the respective courier device.

2. The method of claim 1,
wherein the time threshold for an order corresponds to a predicted time interval for completion of preparation of the order by a respective merchant.

3. The method of claim 2,
wherein the active status threshold corresponds to a courier being online and actively accepting delivery offers.

4. The method of claim 3,
wherein, for each preferred pairing, the route pairing notification is transmitted only if a projected time value for the associated route is greater than or equal to an expected preparation time value associated with the order corresponding to the preferred pairing; and
wherein, for each preferred pairing, if the projected time value for the associated route is not greater than or equal to the expected preparation time value, the order and the available courier corresponding to the preferred pairing are marked for reconsideration in generating a subsequent set of preferred pairings.

5. The method of claim 4, wherein the projected time value for a route corresponds to an estimated time that the courier corresponding to the route will arrive at a respective merchant, and wherein the expected preparation time value for an order corresponds to an estimated time of completion of preparation of the order by a respective merchant.

6. The method of claim 1, wherein the geographic items include one or more of the following:
- geographic proximity between a real-time location of a courier and a location of a pick-up location corresponding to an order,
- regional boundaries,
- supply and demand conditions, and
- historical courier data.

7. The method of claim 1, wherein the infeasible pairings are determined based on additional constraints, wherein the additional constraints include one or more of the following: vehicle type, vehicle size, order size, and type of food.

8. The method of claim 4, further comprising inputting the first filtered dataset and the second filtered dataset into a trained neural network to automatically predict projected time values and expected time values based on trained factors including: vehicle type, vehicle size, order size, and type of food.

9. The method of claim 1, wherein the available couriers in the second filtered dataset are determined by expanding or contracting an active region defined by the geohashed coordinate values to maintain a predetermined ratio of the plurality of available couriers to the one or more orders of the first dataset within the active region.

10. A system for dynamic pairing function optimization, the system comprising: one or more processors, memory, and one or more programs stored in the memory, the one or more programs comprising instructions for:
- receiving a plurality of orders created for real-time deliveries of perishable goods from a plurality of merchants, wherein each order is received from a user device, each user device corresponding to a customer;
- receiving a confirmation message for one or more orders of the plurality of orders, wherein each confirmation message is received from a merchant device corresponding to a merchant associated with a respective order;
- generating a first filtered dataset including one or more orders of the plurality of orders, wherein each order in the first filtered dataset is filtered by a time threshold and a confirmation milestone indicating a receipt of a respective confirmation message;
- generating a second filtered dataset corresponding to a plurality of available couriers, wherein each available courier in the second filtered dataset is filtered by an active status threshold corresponding to a login message received from a courier device associated with the available courier;
- receiving geographic data items from the courier devices corresponding to the plurality of available couriers, the geographic data items including geohashed coordinate values indicating locations of the courier devices;
- shard sorting a union of the first filtered dataset and the second filtered dataset into a plurality of sorted groups such that each sorted group includes respective orders from the first filtered dataset and respective available couriers from the second filtered dataset, wherein the shard sorting is based at least partially on a geographic region corresponding to geographic data items in the first filtered dataset and the second filtered dataset;
- dynamically adjusting a size of the geographic region by adjusting a length of a defining geohashed coordinate value to include available couriers associated with geohashed coordinate values that correspond to the defining geohashed coordinate value in order to provide a desired ratio of respective available couriers to respective orders in each sorted group; and
- for each sorted group:
  - identifying possible data pairings between respective orders from the first filtered dataset and respective available couriers from the second filtered dataset,
  - determining feasible pairings by filtering the possible data pairings to eliminate infeasible pairings, wherein infeasible pairings are determined using factors including transportation mode;
  - generating routes associated with each feasible pairing,
  - scoring each feasible pairing based on weighted factors,
  - determining a set of preferred pairings comprising a combination of feasible pairings that maximizes a sum of scores across all feasible pairings, and
  - for each preferred pairing, transmitting a route pairing notification to the respective courier device associated with the available courier that corresponds to the preferred pairing, wherein the route pairing notification provides an offering of the preferred pairing and an associated route at the respective courier device.

11. The system of claim 10, wherein the time threshold for an order corresponds to a predicted time interval for completion of preparation of the order by a respective merchant.

12. The system of claim 11, wherein the active status threshold corresponds to a courier being online and actively accepting delivery assignments.

13. The system of claim 12, wherein, for each preferred pairing, the route pairing notification is transmitted only if a projected time value for the associated route is greater than or equal to an expected preparation time value associated with the order corresponding to the preferred pairing; and wherein, for each preferred pairing, if the projected time value for the associated route is not greater than or equal to the expected preparation time value, the order and the available courier corresponding to the preferred pairing are marked for reconsideration in generating a subsequent set of preferred pairings.

14. The system of claim 13, wherein the projected time value for a route corresponds to an estimated time that the courier corresponding to the route will arrive at a respective merchant, and wherein the expected preparation time value for an order corresponds to an estimated time of completion of preparation of the order by a respective merchant.

15. The system of claim 10, wherein the geographic data items include one or more of the following:
- geographic proximity between a real-time location of a courier and a location of a pick-up location corresponding to an order,
- regional boundaries,
- supply and demand conditions, and
- historical courier data.

16. The system of claim 10, wherein the infeasible pairings are determined based on additional constraints, wherein the additional constraints include one or more of the following: vehicle type, vehicle size, order size, and type of food.

17. The system of claim 13, further comprising inputting the first filtered dataset and the second filtered dataset into a trained neural network to automatically predict projected time values and expected time values based on trained factors including: vehicle type, vehicle size, order size, and type of food.

18. The system of claim 10, wherein the available couriers in the second filtered dataset are determined by expanding or contracting an active region defined by the geohashed coordinate values to maintain a predetermined ratio of the plurality of available couriers to the one or more orders of the first dataset within the active region.

19. A non-transitory computer readable medium storing one or more programs configured for execution by a computer, the one or more programs comprising instructions for:
- receiving a plurality of orders created for real-time deliveries of perishable goods from a plurality of merchants, wherein each order is received from a user device, each user device corresponding to a customer;
- receiving a confirmation message for one or more orders of the plurality of orders, wherein each confirmation message is received from a merchant device corresponding to a merchant associated with a respective order;
- generating a first filtered dataset including one or more orders of the plurality of orders, wherein each order in the first filtered dataset is filtered by a time threshold and a confirmation milestone indicating a receipt of a respective confirmation message;
- generating a second filtered dataset corresponding to a plurality of available couriers, wherein each available courier in the second filtered dataset is filtered by an active status threshold corresponding to a login message received from a courier device associated with the available courier;
- receiving geographic data items from the courier devices corresponding to the plurality of available couriers, the geographic data items including geo-hashed coordinate values indicating locations of the courier devices;
- shard sorting a union of the first filtered dataset and the second filtered dataset into a plurality of sorted groups such that each sorted group includes respective orders from the first filtered dataset and respective available couriers from the second filtered dataset, wherein the shard sorting is based at least partially on a geographic region corresponding to geographic data items in the first filtered dataset and the second filtered dataset;
- dynamically adjusting a size of the geographic region by adjusting a length of a defining geohashed coordinate value to include available couriers associated with geohashed coordinate values that correspond to the defining geohashed coordinate value in order to provide a desired ratio of respective available couriers to respective orders in each sorted group; and
- for each sorted group:
- identifying possible data pairings between respective orders from the first filtered dataset and respective available couriers from the second filtered dataset,
- determining feasible pairings by filtering the possible data pairings to eliminate infeasible pairings, wherein infeasible pairings are determined using factors including transportation mode;
- generating routes associated with each feasible pairing,
- scoring each feasible pairing based on weighted factors,
- determining a set of preferred pairings comprising a combination of feasible pairings that maximizes a sum of scores across all feasible pairings, and
- for each preferred pairing, transmitting a route pairing notification to the respective courier device associated with the available courier that corresponds to the preferred pairing, wherein the route pairing notification provides an offering of the preferred pairing and an associated route at the courier device.

20. The non-transitory computer readable medium of claim 19, wherein the available couriers in the second filtered dataset are determined by expanding or contracting an active region defined by the geohashed coordinate values to maintain a predetermined ratio of the plurality of available couriers to the one or more orders of the first dataset within the active region.

* * * * *